United States Patent
Kobayashi et al.

(10) Patent No.: US 7,507,970 B2
(45) Date of Patent: Mar. 24, 2009

(54) RADIATION IMAGE SENSING APPARATUS AND ITS DRIVING METHOD

(75) Inventors: Isao Kobayashi, Kanagawa (JP); Masakazu Morishita, Kanagawa (JP); Chiori Mochizuku, Kanagawa (JP); Osamu Tsujii, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 11/753,298

(22) Filed: May 24, 2007

(65) Prior Publication Data

US 2007/0221857 A1    Sep. 27, 2007

Related U.S. Application Data

(63) Continuation of application No. 11/196,474, filed on Aug. 4, 2005, now Pat. No. 7,235,789, which is a continuation of application No. 10/366,728, filed on Feb. 14, 2003, now Pat. No. 6,967,332.

(30) Foreign Application Priority Data

| Mar. 1, 2002 | (JP) | ............................ 056127/2002 |
| Aug. 12, 2002 | (JP) | ............................ 234911/2002 |
| Aug. 12, 2002 | (JP) | ............................ 234912/2002 |

(51) Int. Cl.
   *G01T 1/24*    (2006.01)
(52) U.S. Cl. .............................. 250/370.09; 250/336.1; 250/370.01
(58) Field of Classification Search ............ 250/370.01, 250/336.1, 370.09
See application file for complete search history.

(56) References Cited

U.S. PATENT DOCUMENTS

| 5,331,166 A | 7/1994 | Crosetto et al. |
| 5,444,756 A | 8/1995 | Pai et al. |
| 5,664,001 A | 9/1997 | Tachibana et al. |
| 5,771,271 A | 6/1998 | Iodice |
| 5,773,832 A | 6/1998 | Sayed et al. |
| 5,900,654 A | 5/1999 | Spratt |
| 6,075,256 A | 6/2000 | Kaifu et al. |
| 6,198,800 B1 | 3/2001 | Garland et al. |

(Continued)

FOREIGN PATENT DOCUMENTS

| EP | WO 98/03884 | 1/1998 |

(Continued)

OTHER PUBLICATIONS

Japanese Office Action dated Mar. 25, 2008, received in corresponding Japanese Patent Application No. 2003-054520 without English translation.

*Primary Examiner*—Christine Sung

(57) ABSTRACT

This invention has as its object to realize a radiation image sensing apparatus which can adjust (AEC-controls) the amount of incoming light or dose without requiring high-speed driving. Since a second photoelectric conversion element (108) which is used to detect the total dose of radiation that enters a conversion unit is formed independently of pixels having first conversion elements (101) that are formed in the conversion unit on a single substrate, the need for reading out the outputs from the first conversion elements (101) at high speed for the purpose of adjustment of the dose of incoming radiation can be obviated, and another sensor used to adjust the dose need not be added, thus simplifying the structure of a radiation image sensing apparatus.

19 Claims, 22 Drawing Sheets

U.S. PATENT DOCUMENTS

| | | |
|---|---|---|
| 6,243,441 B1 | 6/2001 | Zur |
| 6,404,851 B1 | 6/2002 | Possin et al. |
| 6,643,411 B2 | 11/2003 | Nonaka |
| 6,653,636 B2 | 11/2003 | Busse et al. |
| 6,797,960 B1 | 9/2004 | Spartiotis et al. |
| 6,952,465 B2 * | 10/2005 | Hirai et al. ............. 378/98.8 |
| 7,235,789 B2 * | 6/2007 | Kobayashi et al. ..... 250/370.09 |
| 2002/0025022 A1 | 2/2002 | Kaifu et al. |
| 2003/0086523 A1 | 5/2003 | Tashiro et al. |
| 2004/0041097 A1 | 3/2004 | Ishii et al. |
| 2004/0101100 A1 | 5/2004 | Morii et al. |
| 2007/0096033 A1 * | 5/2007 | Freund et al. .......... 250/370.11 |

FOREIGN PATENT DOCUMENTS

| | | |
|---|---|---|
| EP | 0756416 | 12/1999 |
| JP | 05-130990 | 5/1993 |
| JP | 11-188021 | 7/1999 |
| JP | 11-513122 | 11/1999 |

\* cited by examiner

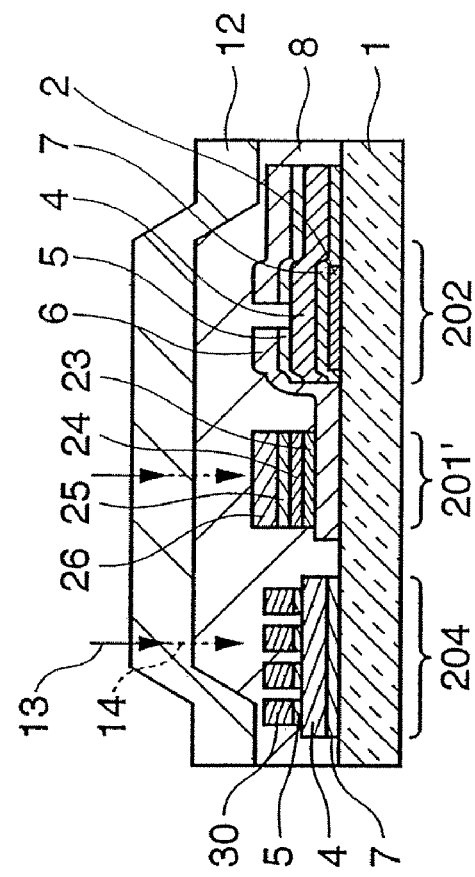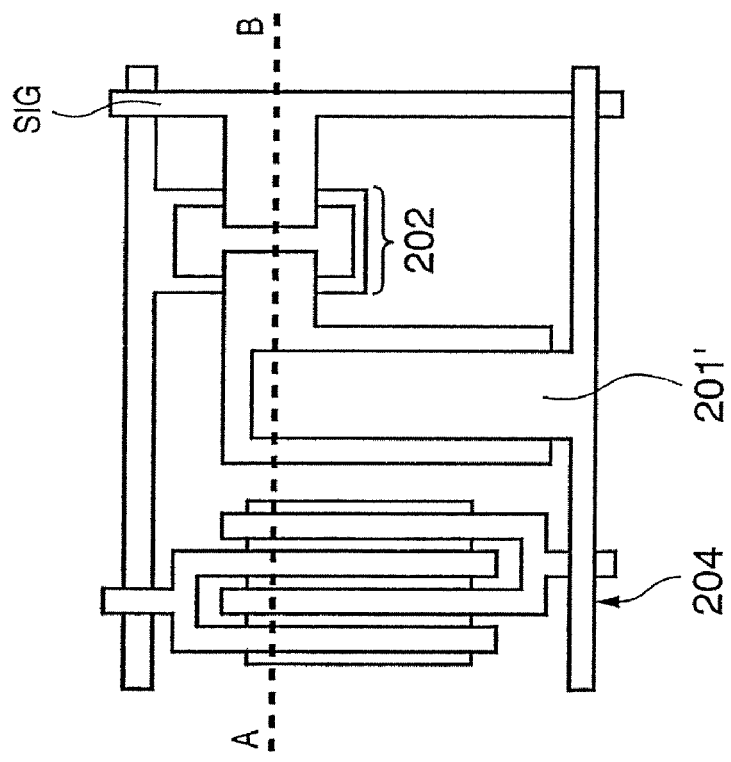

FIG. 5A
FIG. 5B
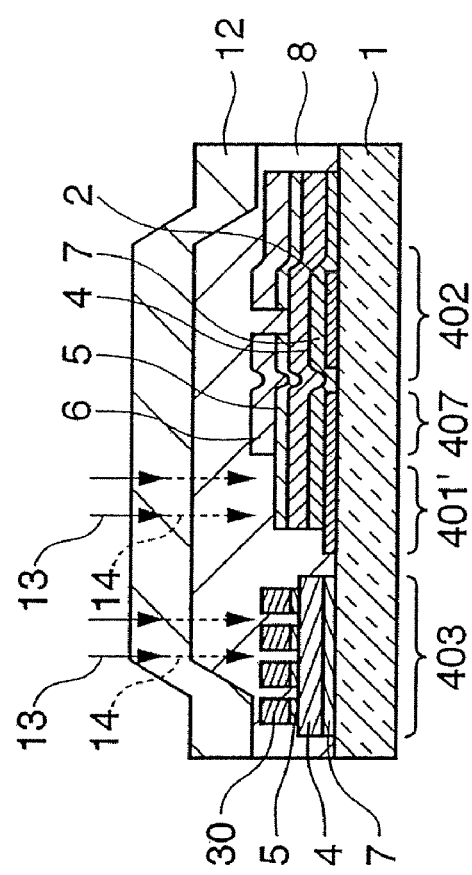
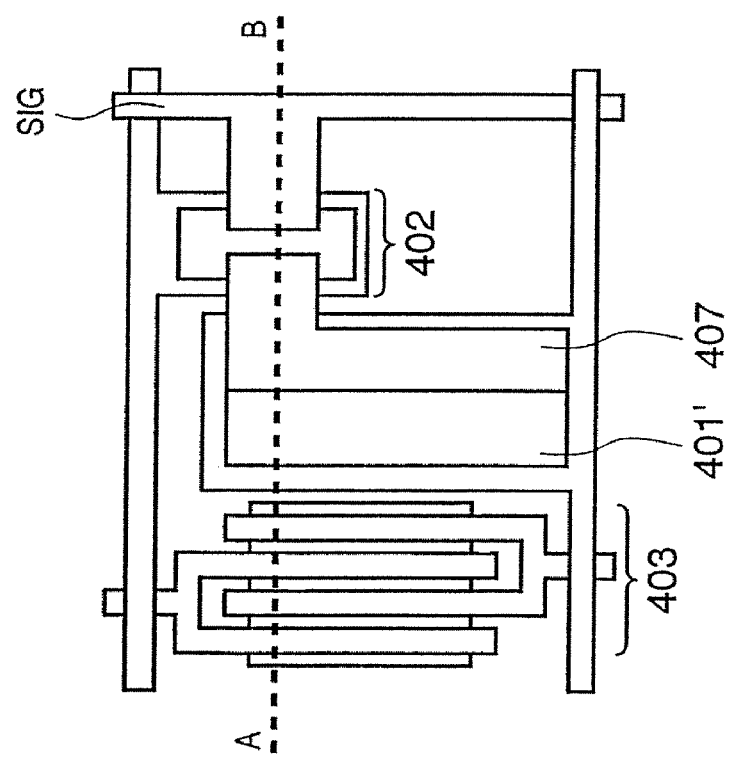

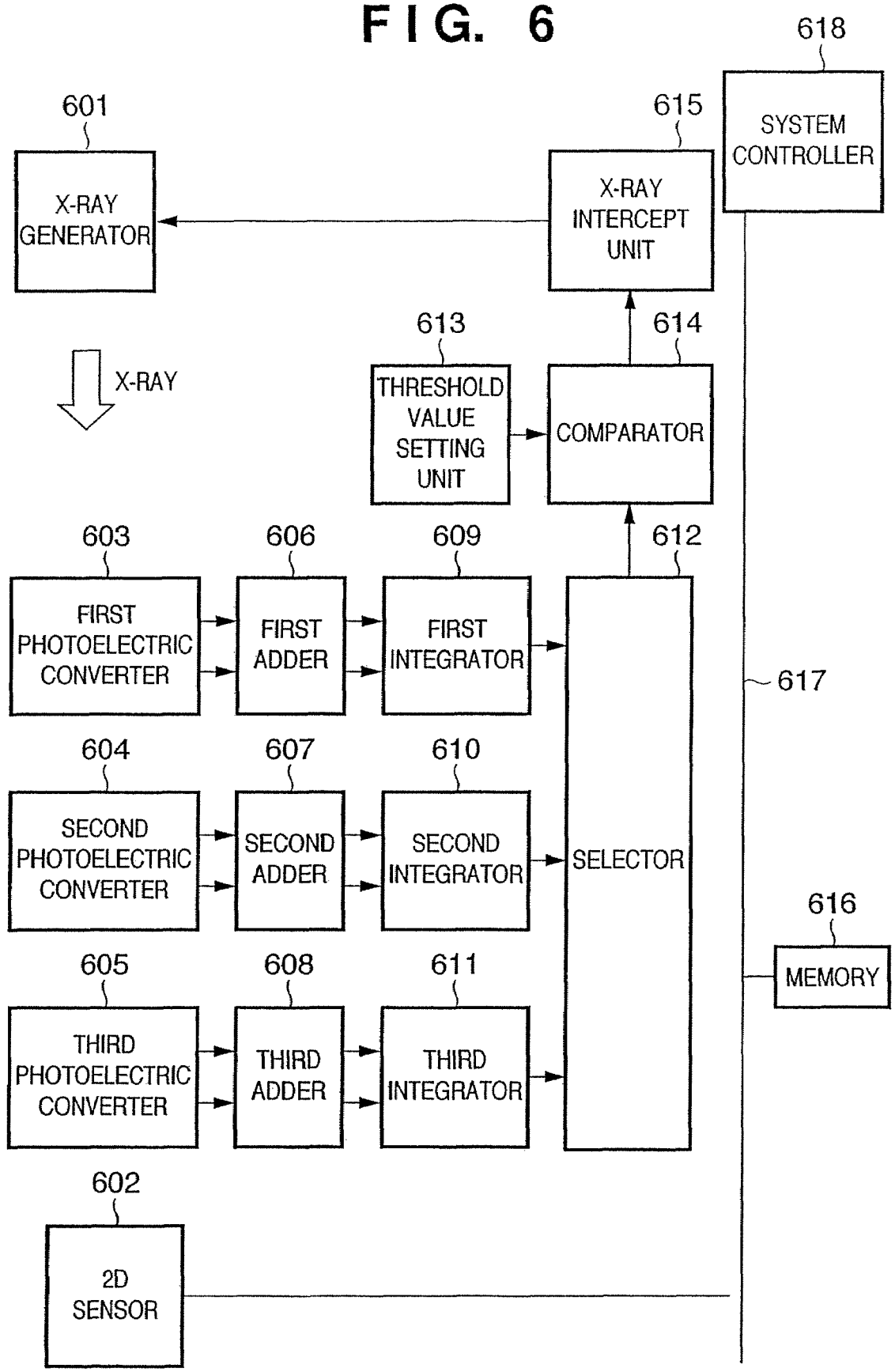

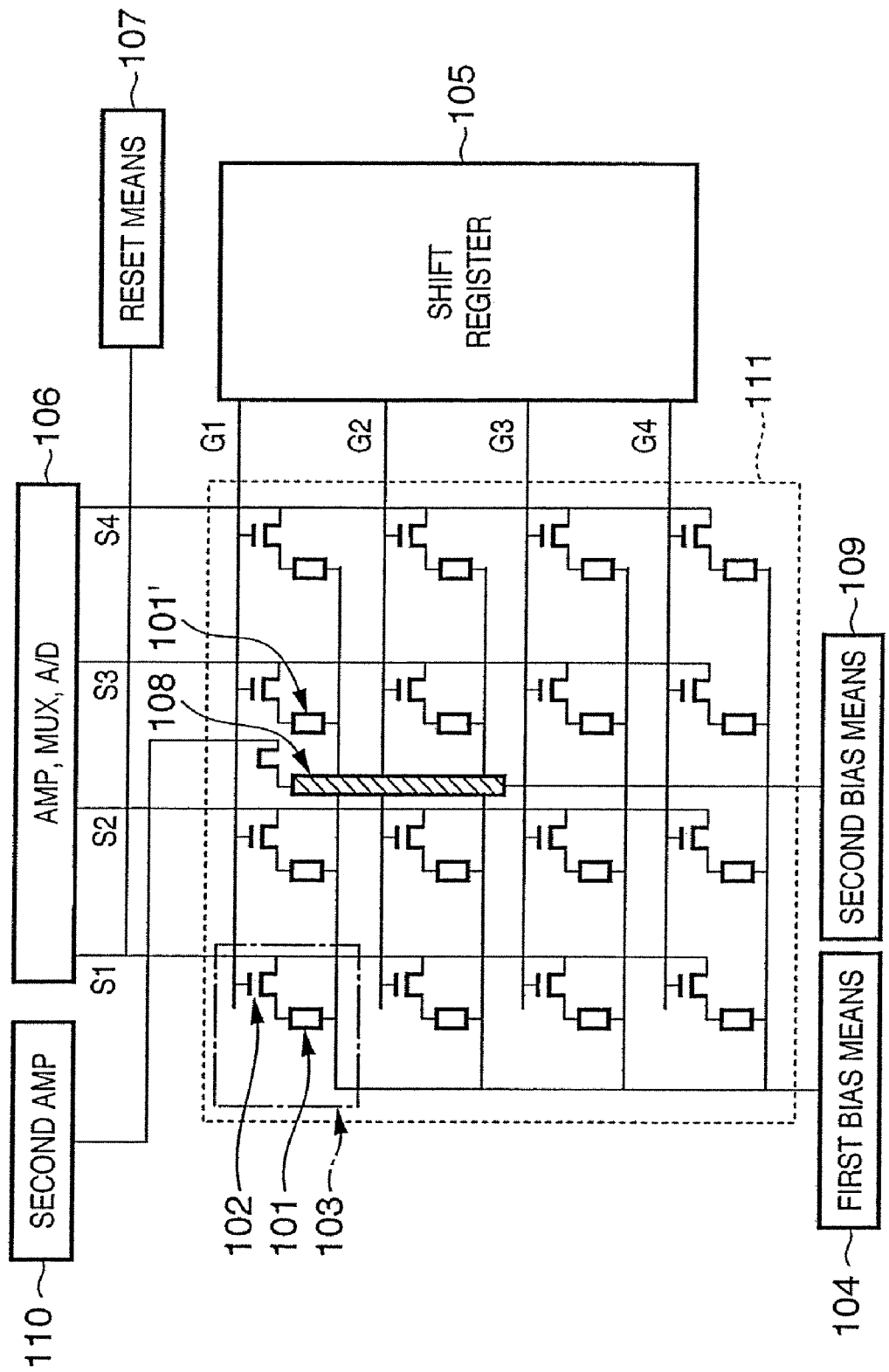

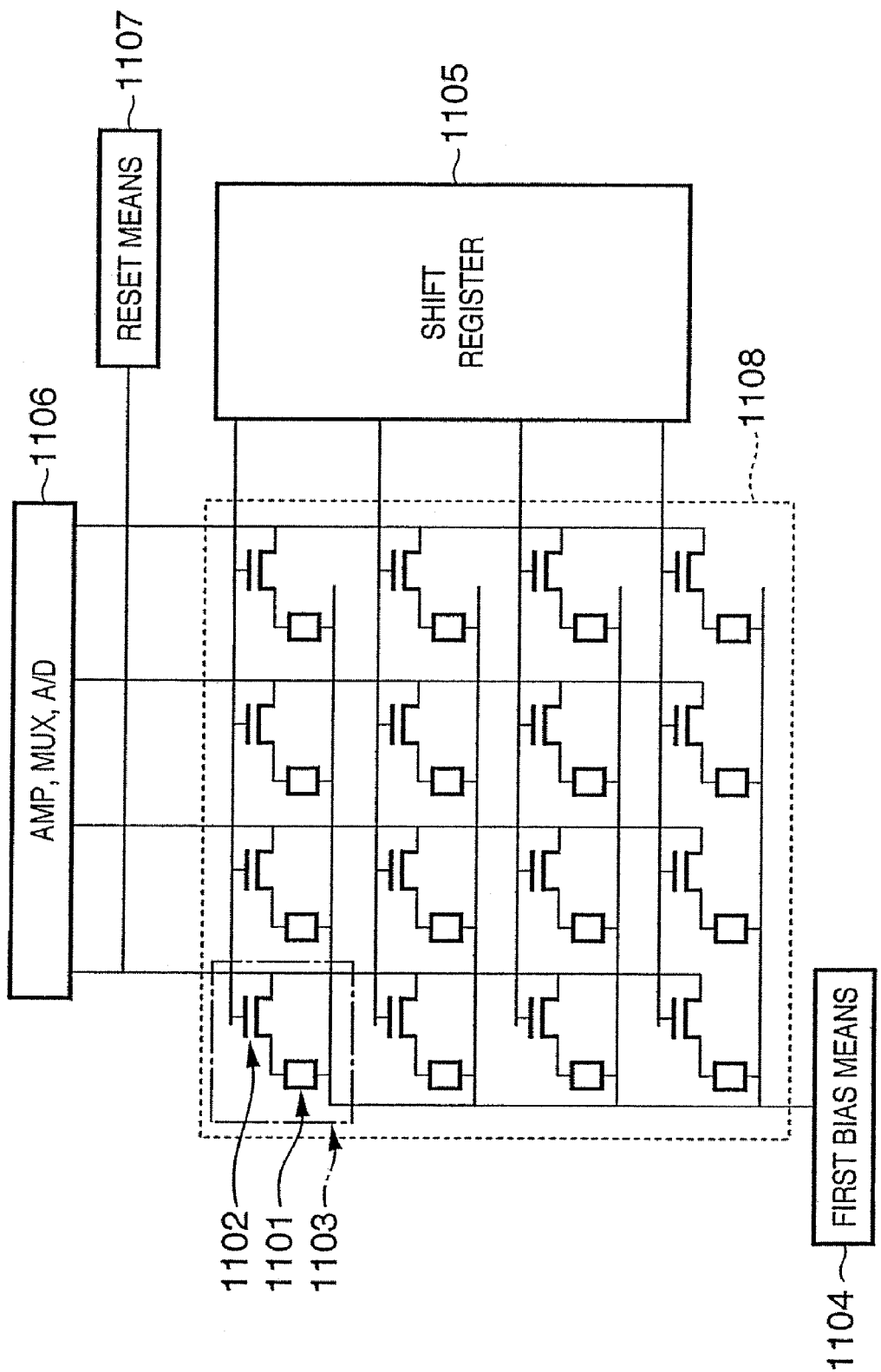

RADIATION IMAGE SENSING APPARATUS AND ITS DRIVING METHOD

RELATED APPLICATION INFORMATION

This application is a continuation of U.S. application Ser. No. 11/196,474 filed Aug. 4, 2005 now U.S. Pat. No. 7,235,789, which is a continuation of U.S. application Ser. No. 10/366,728 filed Feb. 14, 2003, now Patented as U.S. Pat. No. 6,967,332, which are incorporated herein by reference.

FIELD OF THE INVENTION

The present invention relates to a radiation image sensing apparatus and its driving method and, more particularly, to a technique which is suitable for a device that forms an image by radiation, and a device that outputs image information corresponding to incoming radiation.

BACKGROUND OF THE INVENTION

In recent years, a demand for "digitization of X-ray image information" has increasingly arisen in the medical field. If such digitization is achieved, a doctor can examine X-ray image information of a patient at an optimal angle in real-time, and the obtained X-ray image information can be recorded and managed using a medium such as a magnetooptical disk or the like. Using a facsimile or other communication methods, X-ray image information of a patient can be sent to any hospitals on the globe within a short period of time.

In nondestructive inspection represented by inspection of the interior of an object such as the skeleton of a building or the like, installation of various devices required for X-ray image sensing, and image sensing of a required portion cannot be done so frequently.

Therefore, in such field, a demand for providing X-ray image information of a desired portion in real time is increasing. Hence, an X-ray image sensing apparatus which uses a CCD solid-state image sensing element or amorphous silicon sensor in place of a film has been proposed recently.

An example of a radiation image sensing apparatus that we proposed previously will be explained below.

FIG. 11 is a circuit diagram showing the arrangement of a two-dimensional (2D) area sensor. FIGS. 12A and 12B are respectively a plan view and sectional view of respective building components corresponding one pixel of the 2D area sensor; FIG. 12A is a plan view and FIG. 12B is a sectional view.

The radiation image sensing apparatus shown in FIG. 11 comprises a 2D matrix of a total of 16 pixels 1103, i.e., 4 cells in the vertical direction×4 cells in the horizontal direction. Each pixel 1103 comprises a set of a sensor element 1101, and a transfer transistor 1102 connected to the element 1101.

The sensor elements 1101 are connected to a bias means 1104, and the gates of the transfer transistors 1102 are connected to a shift register 1105 via gate lines. Output signals of the transfer transistors 1102 are transferred to an amplifier/multiplexer/A/D converter 1106 via signal output lines, and are processed in turn. A reset means 1107 is connected to the signal output lines of the transfer transistors 1102.

A portion bounded by the broken line in FIG. 11 is formed on a single, large-area insulating substrate 1108. FIG. 12A is a plan view of a portion corresponding to one pixel.

As shown in FIG. 12A, a photoelectric conversion element 1101, TFT (thin film transistor) 1102, and a signal line SIG are formed. FIG. 12B is a sectional view taken along a broken line A-B in FIG. 12A.

According to the layer structure shown in FIG. 12B, the photoelectric conversion element 1101, TFT 1102, and signal line SIG are simultaneously stacked and formed on an insulating substrate 1. These components are formed by only stacking a common lower metal layer 2, silicon nitride layer (SiN) 7, i-layer 4, n-layer 5, and upper metal layer 6 in turn on the insulating substrate 1, and etching these layers. After that, a P-layer 23, I-layer 24, and N-layer 25 are formed as the photoelectric conversion element 1101, and an upper electrode layer 26 of ITO or the like is formed on the element 1101.

Also, a passivation silicon nitride film (SiN) 8 and a phosphor 12 which is made up of CsI, $Gd_2O_2S$, or the like and wavelength-converts radiation into visible light, are formed on the upper portion of a pixel. When X-rays 13 that contain image information enter the radiation image sensing apparatus, they are converted by the phosphor 12 into image information light 14, which enters the photoelectric conversion element 1101.

An X-ray automatic exposure controller (AEC) that automatically controls the exposure of X-rays emitted by an X-ray source in the radiation image sensing apparatus will be explained below.

In general, in the radiation image sensing apparatus having a 2D sensor matrix, the amount of incoming light must be adjusted (undergo AEC control). This control can be classified into the following two processes.

(1) An AEC control sensor is arranged independently of the radiation image sensing apparatus.

(2) All or some sensor elements in the radiation image sensing apparatus are read at high speed, and are used as an AEC control signal.

Conventionally, a plurality of low-profile AEC control sensors with an X-ray attenuation ratio of around 5% are arranged on the front surface of a 2D sensor that converts an incoming X-ray pattern into a 2D image, and X-ray radiation is stopped by the outputs from these AEC control sensors, thus obtaining an X-ray dose suited to image formation. As an AEC control sensor used in this case, a sensor that directly extracts a charge using an ion chamber, or a sensor which externally extracts phosphor light via a fiber, and converts the extracted light into a charge using a photomultiplier, is used.

However, when the AEC control sensors are independently provided to the radiation image sensing apparatus having the 2D sensor matrix so as to adjust (AEC control) the amount of incoming light or dose, the layout of the AEC control sensors poses a problem. That is, information required for AEC control is present at the central portion of an object, and in order to lay out the AEC control sensors without disturbing image sensing of the image sensing sensor, another optical means or AEC control sensors which have a very low optical attenuation ratio are required.

When all pixels are used, AEC control can be done in a sensor with a relatively small number of pixels. However, in a sensor with 2,000×2,000 pixels or more, a high-speed driving circuit is required, resulting in an increase in cost of the overall apparatus.

Since high-speed driving is required, it becomes difficult for the sensor of the radiation image sensing apparatus to assure a sufficiently long charge accumulation time, charge transfer time, and capacitor reset time, and the like, resulting in poor image quality of a sensed image.

SUMMARY OF THE INVENTION

The present invention has been made in consideration of the aforementioned problems, and has as its object to provide a radiation image sensing apparatus and its driving method, which can adjust (AEC control) the amount of incoming light or dose without requiring high-speed driving.

A radiation image sensing apparatus of the present invention is directed to a radiation flat panel detector sensing apparatus which has a conversion unit that comprises a plurality of pixels having first conversion elements, and switch elements connected to the first conversion elements on a substrate, and which outputs image information in accordance with a intensity of radiation that enters the conversion unit, comprising a second conversion element which is formed on the substrate to detect a total intensity of radiation that enters the conversion unit and/or start/stop of a irradiation of radiation, and a processing circuit unit which is connected to the second conversion element and processes a detected signal.

A method of driving a radiation image sensing apparatus of the present invention is directed to a method of driving a radiation image sensing apparatus, which has a conversion unit that comprises a plurality of pixels having first conversion elements, and switch elements connected to the first conversion elements on a substrate, a second conversion element which is formed on the substrate to detect a total intensity of radiation that enters the conversion unit, and a processing circuit unit which is connected to the second conversion element, comprising the step of making the processing circuit unit detect the total intensity and/or start/stop of a irradiation of radiation and controlling the intensity of radiation that enters the conversion unit, in accordance with an output from the second conversion element.

A radiation image sensing apparatus of the present invention is directed to a radiation image sensing apparatus for outputting image information corresponding to incoming radiation, comprising a substrate, conversion means which comprises, on the substrate, a plurality of pixels each of which has a first conversion element that converts the incoming radiation into an electrical signal, and a switch element connected to the first conversion element, and total intensity detection means which comprises a second conversion element that is formed on the substrate and converts the incoming radiation into an electrical signal, and a processing circuit that is connected to the second conversion element and detects a total dose of radiation that enters the conversion means, wherein radiation detection of the second conversion element is disabled at a timing at which image information is output in accordance with the dose of radiation that enters the first conversion elements.

According to an aspect of the radiation image sensing apparatus of the present invention, the second conversion element has a TFT structure, and the processing circuit unit disables radiation detection of the second conversion elements by setting source and drain electrodes of the second conversion element at a ground potential or another identical potential.

According to an aspect of the radiation image sensing apparatus of the present invention, the processing circuit unit extracts an electrical signal from the second conversion element as a current.

According to an aspect of the radiation image sensing apparatus of the present invention, the processing circuit unit includes addition means for adding a charge output from the second conversion element, integral means for integrating the charge added by the addition means, comparison means for comparing an integral value obtained by the integral means with a threshold value which is set in advance, and radiation interception means for, when the comparison means determines that the integral value is larger than the threshold value, stopping radiation with which the conversion means is irradiated.

According to an aspect of the radiation image sensing apparatus of the present invention, the second conversion element is formed at a plurality of positions on the substrate, and the processing circuit unit detects the intensity of radiation by selecting the second conversion element at an optimal position from the plurality of second conversion elements.

According to an aspect of the radiation image sensing apparatus of the present invention, each of the first conversion elements is formed to have a MIS semiconductor structure.

A method of driving a radiation image sensing apparatus of the present invention is directed to a method of driving a radiation image sensing apparatus for outputting image information corresponding to incoming radiation, which apparatus includes a substrate, conversion means which comprises, on the substrate, a plurality of pixels each of which has a first conversion element that converts the incoming radiation into an electrical signal, and a switch element connected to the first conversion element, and total dose detection means which comprises a second conversion element that is formed on the substrate and converts the incoming radiation into an electrical signal, and a processing circuit that is connected to the second conversion element and detects a total dose of radiation that enters the conversion means, the method comprising the step of disabling radiation detection of the second conversion element at a timing at which image information is output in accordance with the dose of radiation that enters the first conversion elements.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A and 3B are respectively a plan view and sectional view of building components corresponding to one pixel of the radiation image sensing apparatus of the second embodiment;

FIGS. 5A and 5B are respectively a plan view and sectional view of building components corresponding to one pixel of the radiation image sensing apparatus of the third embodiment;

FIG. 6 is a system block diagram of a radiation image sensing apparatus according to the fourth embodiment of the present invention;

FIG. 10 is a circuit diagram of a radiation image sensing apparatus according to the eighth embodiment of the present invention;

FIG. 11 is a circuit diagram showing the arrangement of a conventional 2D area sensor;

DETAILED DESCRIPTION OF THE PREFERRED EMBODIMENTS

Preferred embodiments of the present invention will now be described in detail in accordance with the accompanying drawings.

Preferred embodiments of a radiation image sensing apparatus and its driving method according to the present invention will be described hereinafter with reference to the accompanying drawings.

First Embodiment

The first embodiment of the present invention will be described below with reference to FIG. 1.

Figure 1:
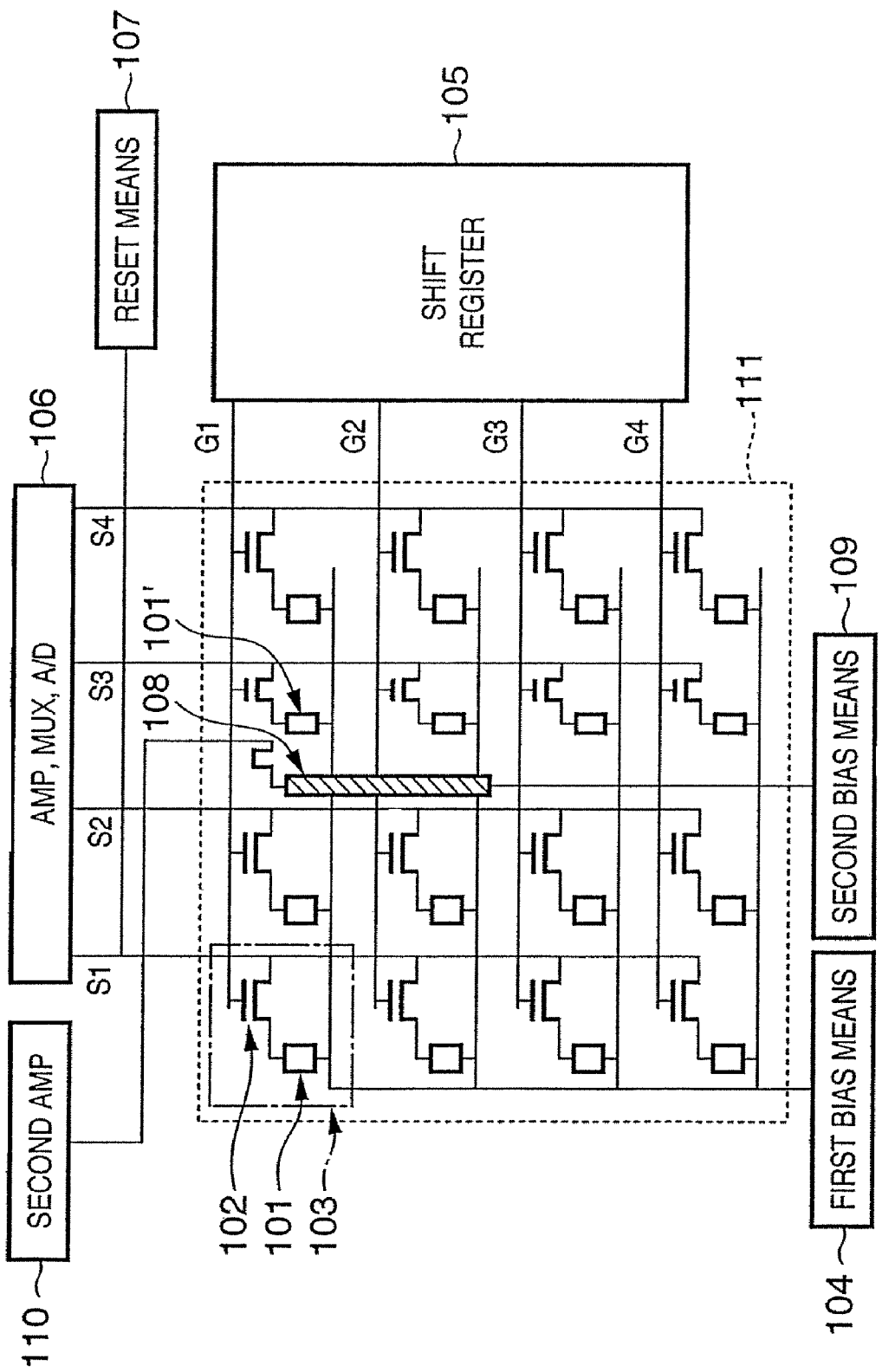
FIG. 1 is a circuit diagram of a radiation image sensing apparatus according to the first embodiment of the present invention.

FIG. 1 is a circuit diagram of a radiation image sensing apparatus of this embodiment. As shown in FIG. 1, the radiation image sensing apparatus of this embodiment comprises a 2D matrix of a total of 16 pixels 103, i.e., 4 cells in the vertical direction×4 cells in the horizontal direction. Each pixel 103 comprises a first photoelectric conversion element 101, and a transistor 102, which is connected to the element 101 and serves as a transfer switch element.

The first photoelectric conversion elements 101 are connected to a first bias means 104, and the gates of the transistors 102 are connected to a shift register 105 via gate lines G1 to G4 for respective rows. Output signals of the transistors 102 are transferred to an amplifier/multiplexer/A/D converter 106 via signal lines S1 to S4 for respective columns, and undergo signal processes in turn. A reset means 107 is connected to the signal lines S1 to S4 of the transistors 102 for respective columns.

Furthermore, an elongated second photoelectric conversion element 108, hatched in FIG. 1, is arranged. The second photoelectric conversion element 108 has a shape different from those of the first photoelectric conversion elements 101 used to sense a normal image.

The first photoelectric conversion elements 101 correspond to gray element portions in FIG. 1, which are arranged at equal pitches p in a 4×4 2D matrix, and are connected to the first bias means 104.

Charges generated by the first photoelectric conversion elements 101 corresponding to a row selected by the shift register 105 are read out via the transistors 102, are transferred to the amplifier/multiplexer/A/D converter 106, are selectively amplified by the amplifier (AMP), and are then converted by the A/D converter.

After the charges are read out, the reset means 107 executes a charge reset operation. Note that this operation is not necessary depending on the structure of the radiation image sensing apparatus.

The second photoelectric conversion element 108 is arranged in an elongated shape among the pixels 103 and between the signal lines (S2 and S3) in the column direction. Since the second photoelectric conversion element 108 is flush with the first photoelectric conversion elements 101, first photoelectric conversion elements 101' which neighbor the second photoelectric conversion element 108 have an area smaller than those of other first photoelectric conversion elements 101.

The second photoelectric conversion element 108 is connected to a second bias means 109. Upon reading out a charge, the second photoelectric conversion element 108 can always output a charge according to the amount of incoming light without being selected by the shift register 105. For this purpose, the second photoelectric conversion element 108 is always applied with a constant potential. A charge detected by the second photoelectric conversion element 108 is amplified by a second amplifier (AMP) 110, and the total dose of radiation is detected by adding the output from the second amplifier 110.

According to this embodiment, since an AEC control sensor (second photoelectric conversion element 108) is formed in a photoelectric conversion substrate 111, it need not be independently arranged, a radiation detection apparatus can be made compact, and the circuit arrangement can be simplified. Since the AEC control sensor has an arrangement independent from a sensor (first photoelectric conversion elements) used to acquire image information, and a processing circuit unit is independently arranged, the need for reading out a charge by high-speed driving can be obviated, thus preventing deterioration of the image quality of a sensed image.

Since the AEC control sensor (second photoelectric conversion element 108) is laid out to run across a plurality of pixels in a direction perpendicular to driving lines in the row direction, i.e., in a direction parallel to the signal lines S1 to S4 in the column direction, so as not to form any intersections with the signal lines S1 to S4 in the column direction, an extra capacitance can be prevented from being parasitic on the signal lines S1 to S4, thus allowing to read out output signals with a high S/N ratio. Since the AEC control sensor is laid out to run across a plurality of pixels in a direction parallel to the signal lines, the radiation dose can be detected on the average of a broader region.

Second Embodiment

The second embodiment of the present invention will be described below with reference to FIG. 2 and FIGS. 3A and 3B.

Figure 2:
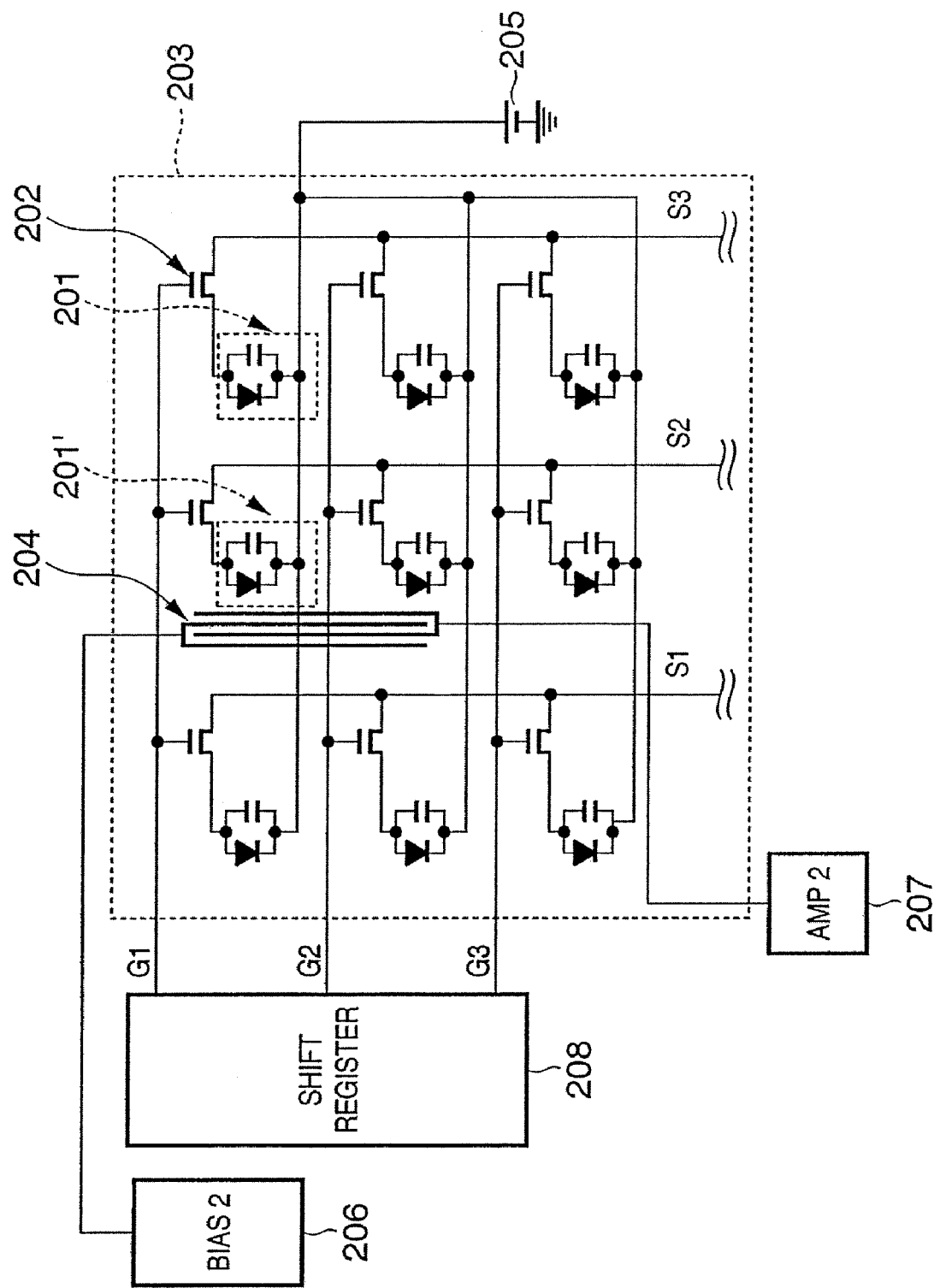
FIG. 2 is a circuit diagram of a radiation image sensing apparatus according to the second embodiment of the present invention.

FIG. 2 is a circuit diagram of a radiation image sensing apparatus of this embodiment. FIGS. 3A and 3B are respectively a plan view and sectional view of building components corresponding to one pixel of the radiation image sensing apparatus; FIG. 3A is a plan view, and FIG. 3B is a sectional view taken along a broken line A-B in FIG. 3A.

In this embodiment, each first photoelectric conversion element 201 has a PIN structure. Each switch element 202 is formed by a TFT (thin film transistor). The gates of the switch elements 202 are connected to a shift register 208 via gate lines G1 to G3. Output signals from the switch elements 202 are externally output via signal lines S1 to S3.

A second photoelectric conversion element 204, which has an elongated shape compared to the first photoelectric conversion elements 201 used to read out a normal image, is laid out in a photoelectric conversion circuit unit 203 formed on a substrate to run across a plurality of pixels in the signal line direction of normal pixels. Especially, in this embodiment, the second photoelectric conversion element 204 is formed in a combtooth shape.

Since the second photoelectric conversion element 204 is flush with the first photoelectric conversion elements 201, first photoelectric conversion element 201' which neighbor the second photoelectric conversion element 204 have an area smaller than those of other first photoelectric conversion elements 201. This decrement of the area can be compensated for by image correction executed after a charge is read out.

The second photoelectric conversion element 204 is connected to a second bias power supply (Bias2) independently of a first bias power supply 205 used to acquire image information, and always outputs a charge in accordance with the amount of incoming light. Hence, the element 204 is always applied with a bias. A charge output from the element 204 is amplified by an amplifier (AMP2) 207.

FIGS. 3A and 3B are respectively a plan view and sectional view of building components corresponding to one pixel of the radiation image sensing apparatus, and the second photoelectric conversion element 204; FIG. 3A is a plan view and FIG. 3B is a sectional view.

Note that the second photoelectric conversion element 204 as an AEC control sensor has a layer structure in which a lower metal layer 2 of the TFT 202 is removed. A formation method of this layer structure will be described below.

A 50-nm thick Cr film is deposited on a glass substrate 1 of an insulating material by, e.g., sputtering to form a lower metal layer 2, which is patterned by photolithography to remove an unnecessary area by etching. As a result, the gate electrode of the TFT 202 is formed.

Then, a 200-nm thick silicon nitride film (SiN) 7, 500-nm thick i-layer 4, and 50-nm n-layer 5 are respectively deposited by CVD in a single vacuum environment. In the TFT 202, the silicon nitride film (SiN) 7 serves as a gate insulating film, the i-layer 4 serves as a semiconductor layer, and the n-layer 5 serves as an ohmic contact layer. Also, in the second photoelectric conversion element 204, the silicon nitride film (SiN) 7 serves as a lower insulating layer, the i-layer 4 serves as a photoelectric conversion semiconductor layer, and the n-layer 5 serves as an ohmic contact layer.

After these layers are deposited, a 1,000-nm thick Al film is deposited by, e.g., sputtering.

Furthermore, the resultant structure is patterned by photolithography to remove an unnecessary area by etching. With this process, an upper metal layer 6, which serves as the source and drain electrodes as main electrodes of the TFT 202, and a signal line SIG, is formed. Also, in the second photoelectric conversion element 204, an upper electrode 30 is formed.

After that, a P-layer 23, I-layer 24, and N-layer 25 are formed as the first photoelectric conversion element 201', and an upper electrode layer 26 of ITO or the like is formed on the resultant structure.

Furthermore, the n-layer 5 in only a channel portion of the TFT 202 is removed by etching, and unnecessary layers are then removed by etching to isolate elements.

With the aforementioned fabrication process, the first photoelectric conversion element 201', TFT 202, and second photoelectric conversion element 204 are fabricated. The process for one pixel has been described, but other pixels are formed at the same time.

In order to improve durability, a passivation film 8 of, e.g., a silicon nitride film (SiN) or the like is formed on the respective elements to cover them, and a phosphor 12, which is made up of CsI, $Gd_2O_2S$, or the like and serves as a waveform converter, is further formed.

In this embodiment, since the second photoelectric conversion element 204 as the AEC control sensor need only detect the total dose of incoming radiation, it is always applied with a bias during irradiation. For this reason, the second photoelectric conversion element 204 can be fabricated as a structure obtained by removing the lower metal layer 2 of the TFT 2, thus simplifying the fabrication process and achieving a cost reduction.

Third Embodiment

The third embodiment of the present invention will be described below with reference to FIG. 4 and FIGS. 5A and 5B.

Figure 4:
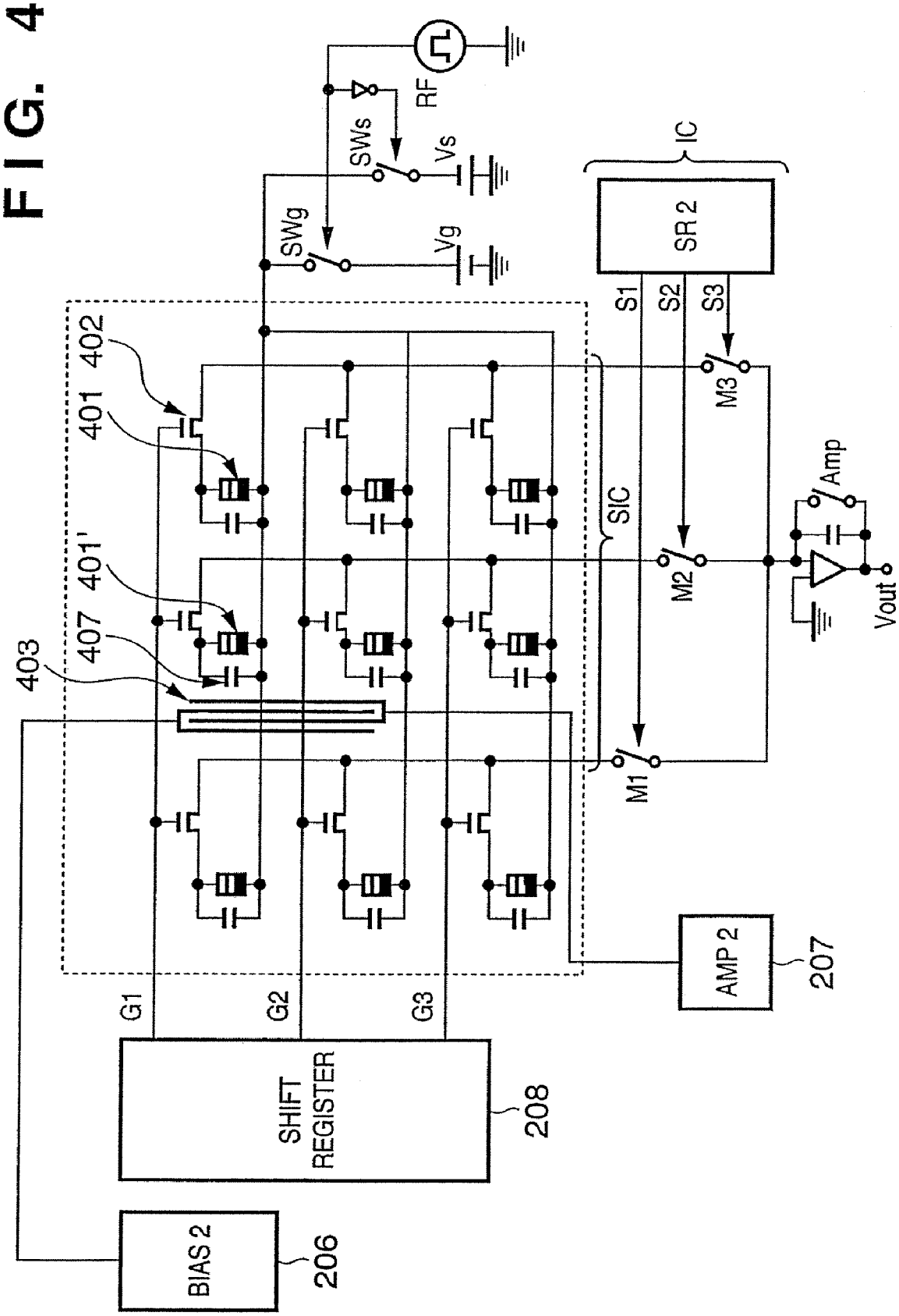
FIG. 4 is a circuit diagram of a radiation image sensing apparatus according to the third embodiment of the present invention.

FIG. 4 is a circuit diagram of a radiation image sensing apparatus of this embodiment. FIGS. 5A and 5B are respectively a plan view and sectional view of building components corresponding to one pixel of the radiation image sensing apparatus; FIG. 5A is a plan view and FIG. 5B is a sectional view. In this embodiment, a first photoelectric conversion element 401 has an MIS structure, and a switch element 402 comprises a TFT.

In this embodiment as well, first photoelectric conversion elements 401' which neighbor a second photoelectric conversion element 403 have an area smaller than those of other first photoelectric conversion element 401.

The second photoelectric conversion element 403 is connected to a second bias power supply (Bias2) 206, need not be selected by a shift register 208 upon reading out a charge, and is always applied with a bias so as to output a charge in accordance with the amount of incoming light all the time. A charge generated by the second photoelectric conversion element 403 is amplified by an amplifier (AMP2) 207.

FIGS. 5A and 5B are respectively a plan view and sectional view of one pixel which includes the second photoelectric conversion element 403, and its neighboring first photoelectric conversion element 401'; FIG. 5A is a plan view and FIG.

5B is a sectional view. A formation method of the structure shown in FIGS. 5A and 5B will be described below.

A 50-nm thick Cr film is deposited on a glass substrate 1 of an insulating material by, e.g., sputtering to form a lower metal layer 2, which is patterned by photolithography to remove an unnecessary area by etching. In this case, the lower electrode layer 2 on a prospective formation region of the second photoelectric conversion element 403 is removed. As a result, the lower electrode of the photoelectric conversion element 401', the gate electrode of the TFT 402, and the lower electrode of a capacitor 407 are formed.

Then, a 200-nm thick silicon nitride film (SiN) 7, 500-nm thick i-layer 4, and 50-nm n-layer 5 are respectively deposited by CVD in a single vacuum environment. In the photoelectric conversion element 401', the silicon nitride film (SiN) 7 serves as a lower insulating film, the i-layer 4 serves as a photoelectric conversion semiconductor layer, and the n-layer 5 serves as a hole injection blocking layer. Also, in the TFT 402, the silicon nitride film (SiN) 7 serves as a gate insulating film, the i-layer 4 serves as a semiconductor layer, and the n-layer 5 serves as an ohmic contact layer. Furthermore, in the capacitor 407, the silicon nitride film (SiN) 7, i-layer 4, and n-layer 5 serve as interlayers. Moreover, in the second photoelectric conversion element 403, the silicon nitride film (SiN) 7 serves as a lower insulating film, the i-layer 4 serves as a photoelectric conversion semiconductor layer, and the n-layer 5 serves as an ohmic contact layer.

Also, these layers are used as cross-part insulating layers of a signal line SIG.

The thicknesses of the respective layers are not limited to such specific values, and are optimally designed depending on the voltage, current, charge, amount of incoming light, and the like used for a 2D area sensor. However, at least the silicon nitride layer (SiN) 7 must have a thickness of 50 nm or more so as to block electrons and holes and to serve as a gate insulating film of the TFT 402.

After these layers are deposited, a 1,000-nm thick Al film is deposited by, e.g., sputtering. Furthermore, the resultant structure is patterned by photolithography to remove an unnecessary area by etching. With this process, the upper electrode of the photoelectric conversion element 401', the source and drain electrodes as main electrodes of the TFT 402, the upper electrode of the capacitor 407, the signal line SIG, and an upper electrode 30 of the second photoelectric conversion element 402 are formed. Note that an ITO film or the like may be formed only on the upper electrodes of the first and second photoelectric conversion elements 401' and 403 depending on element characteristics.

Furthermore, the n-layer 5 in only a channel portion of the TFT 402 is removed by etching, and unnecessary portions of the silicon nitride layer (SiN) 7, i-layer 4, and n-layer 5 are then removed by etching to isolate elements.

With the aforementioned fabrication process, the first photoelectric conversion element 401', TFT 402, second photoelectric conversion element 403, and capacitor 407 are formed. The process for one pixel has been described, but other pixels are formed at the same time.

In order to improve durability, a passivation film 8 of, e.g., a silicon nitride film (SiN) or the like is formed on the respective elements to cover them, and a phosphor 12, which is made up of CsI, $Gd_2O_2S$, or the like and serves as a waveform converter, is further formed.

Note that the second photoelectric conversion element 403 as an AEC control sensor has a layer structure obtained by removing the lower metal layer 2 of the first photoelectric conversion element 401', TFT 402, and capacitor 407, as described above.

In this way, since the AEC control sensor (second photoelectric conversion element 403) need only detect the total dose of incoming radiation, it can be fabricated together with the layer structure of the first photoelectric conversion element 401', switch element 402, and the like, thus achieving a simple fabrication process of the AEC control sensor and a cost reduction.

Fourth Embodiment

The fourth embodiment of the present invention will be described below with reference to FIG. 6.

FIG. 6 is a system block diagram of a radiation image sensing apparatus of this embodiment. X-rays generated by an X-ray generator 6 are converted into visible light by a phosphor unit (not shown), and radiation having image information strikes a 2D sensor 602.

Simultaneously with incidence on the 2D sensor 602, the converted visible light hits first, second, and third photoelectric converters 603, 604, and 605 of a second photoelectric conversion element, which is formed on a sensor substrate and serves as an AEC control sensor.

The photoelectric converters 603, 604, and 605 of the second photoelectric conversion elements as the AEC control sensor are arranged at different positions on the sensor substrate. For example, groups L, R, and C of stripe-shaped AEC control sensors (second photoelectric conversion elements) shown in FIG. 13 may be used.

Figure 13:
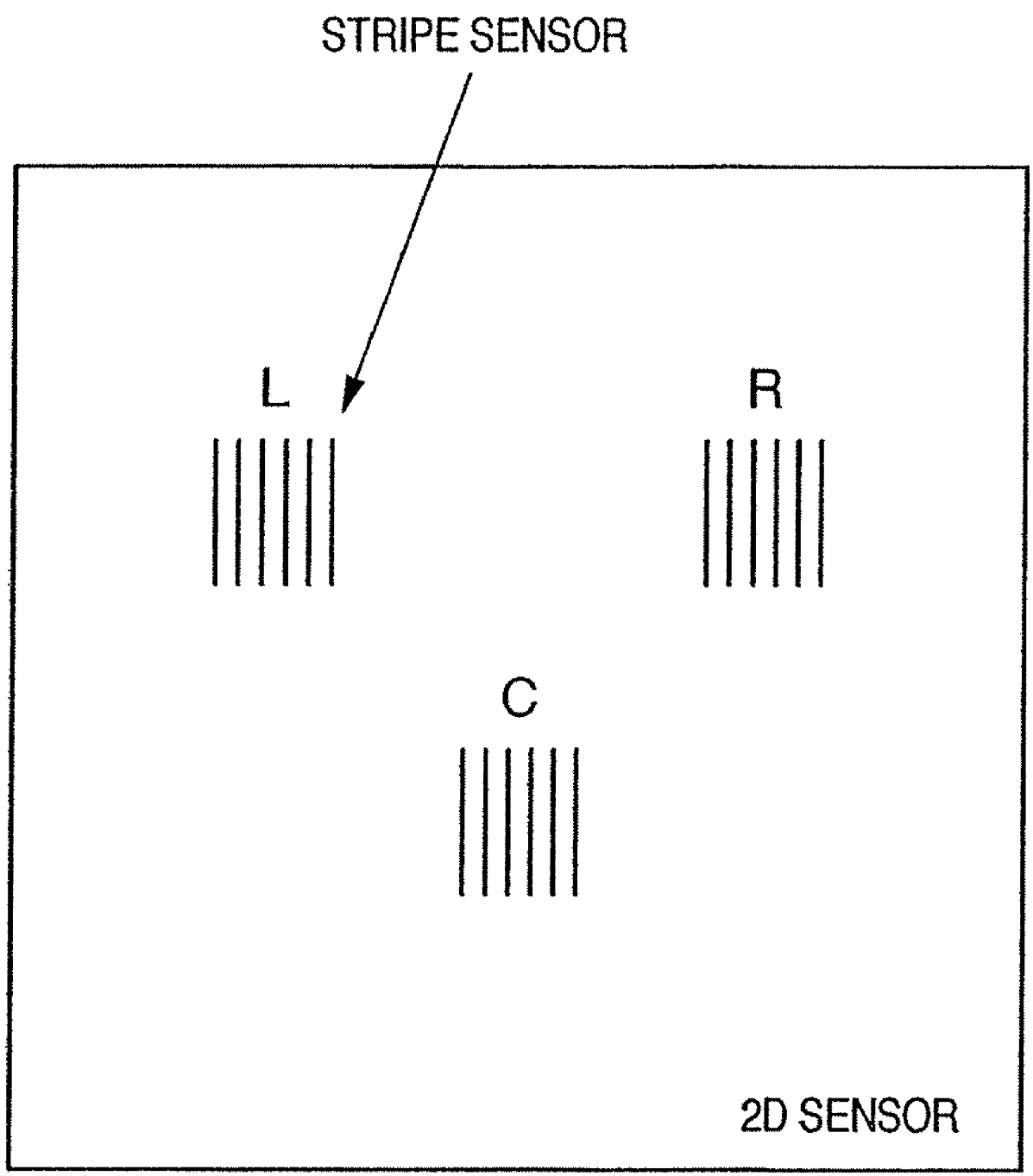
FIG. 13 depicts a layout image of a second photoelectric conversion element in this embodiment.

Charges generated by the photoelectric converters 603, 604, and 605 of the second photoelectric conversion element in response to incoming light are extracted from the photoelectric converters 603, 604, and 605, and are added for respective groups by adders 606 to 608. As an addition method, simple addition, and a method of adding charges by weighting them in correspondence with the positions of six stripes, as shown in FIG. 13, may be used. The charges added by the adders 606 to 608 are integrated by integrators 609 to 611, and the integral outputs are input to a selector 612.

The selector 612 controls whether to selectively use the integral outputs of three channels as the integrators 609 to 611 or to add them to use the sum. This control depends on a portion to be sensed. For example, a larger one of the outputs of groups L and R is selected upon sensing a chest front image, and the output of group C is solely used upon sensing an abdomen or chest side image.

The output selected by the selector 612 is compared with a threshold value which is set in advance in a comparator 614 by a threshold value setting unit 613. If the selected output is larger than the threshold value, an X-ray intercept unit 615 is driven to stop radiation from the X-ray generator 601. When X-ray radiation is stopped, the integral process of the 2D sensor 602 ends, and data from the 2D sensor 602 is transferred to and stored in a memory 616 after A/D conversion. The data stored in the memory 616 is read out or the like under the control of a system controller 618 which is connected via a system bus 617.

Using the output from the second photoelectric conversion element, X-ray radiation stop control can be implemented. Also, the integral process of the 2D sensor 602 can be finished earlier so as to limit unnecessary offset charges accumulated on the 2D sensor 602.

Since data is fetched in synchronism with X-ray radiation stop control, a sensed image can be displayed earlier.

Fifth Embodiment

The fifth embodiment of the present invention will be described below with reference to FIG. 7.

Figure 7:
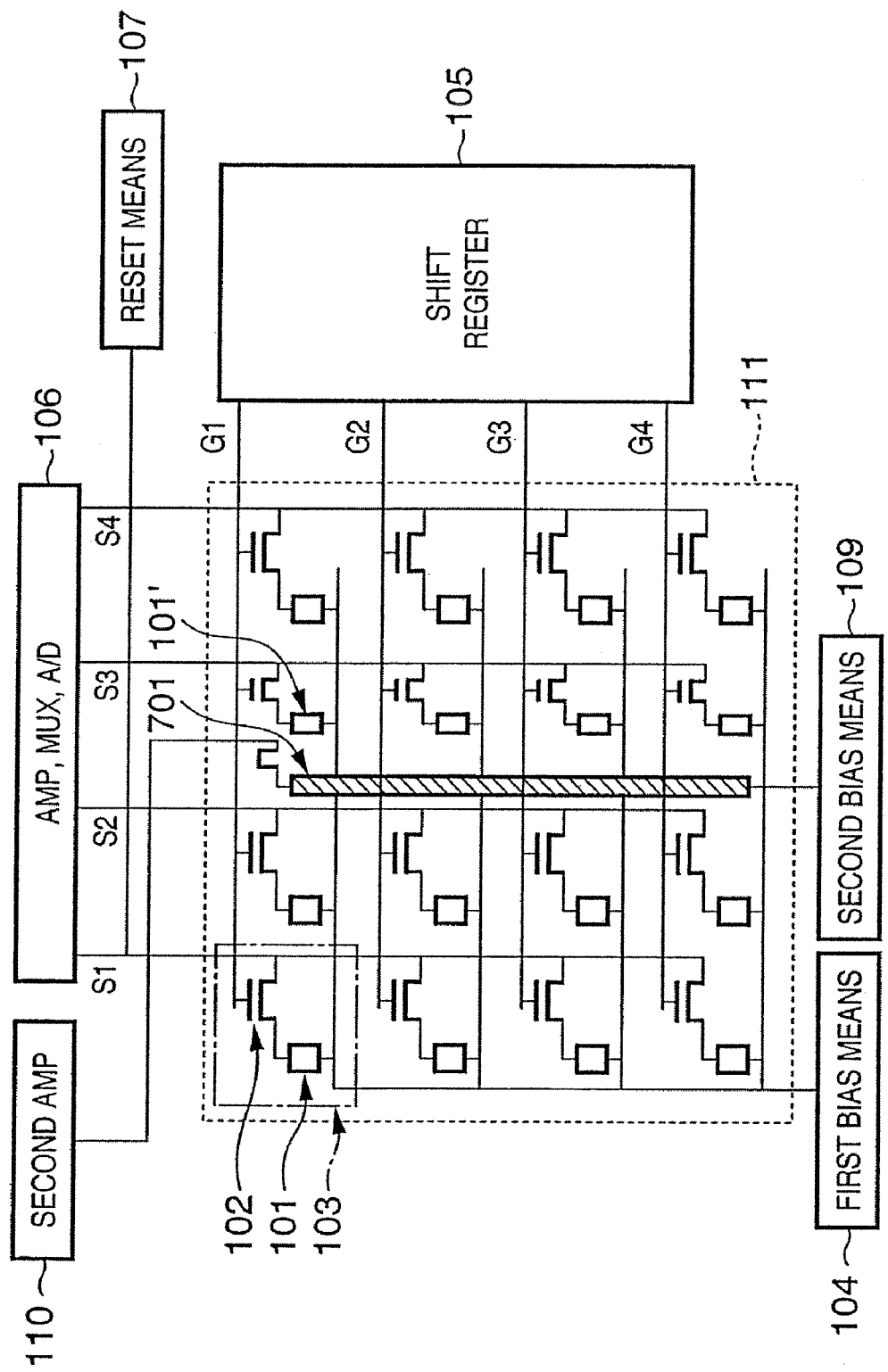
FIG. 7 is a circuit diagram of a radiation image sensing apparatus according to the fifth embodiment of the present invention.

FIG. 7 is a circuit diagram of a radiation image sensing apparatus of this embodiment. Note that the same reference numerals denote the same building components as those described in FIG. 1 of the first embodiment, and differences from the first embodiment will be described below.

In this embodiment, a second photoelectric conversion element 701 as an AEC control sensor has a size for four pixels (from one edge pixel to another edge pixel).

In this manner, the width in a direction parallel to signal lines S1 to S4 is smaller than the pitch of pixels 103, and the length is around four times of the pitch of the pixels 103 since it amounts to four pixels, Since the light-receiving area of the second photoelectric conversion element 701 as the AEC control sensor is increased by increasing the width in the direction parallel to the signal lines S1 to S4, a photocurrent generated by the second photoelectric conversion element 701 as the AEC control sensor can be increased, thus improving the sensitivity of the AEC control sensor (second photoelectric conversion element 701).

Sixth Embodiment

The sixth embodiment of the present invention will be described below with reference to FIG. 8.

Figure 8:
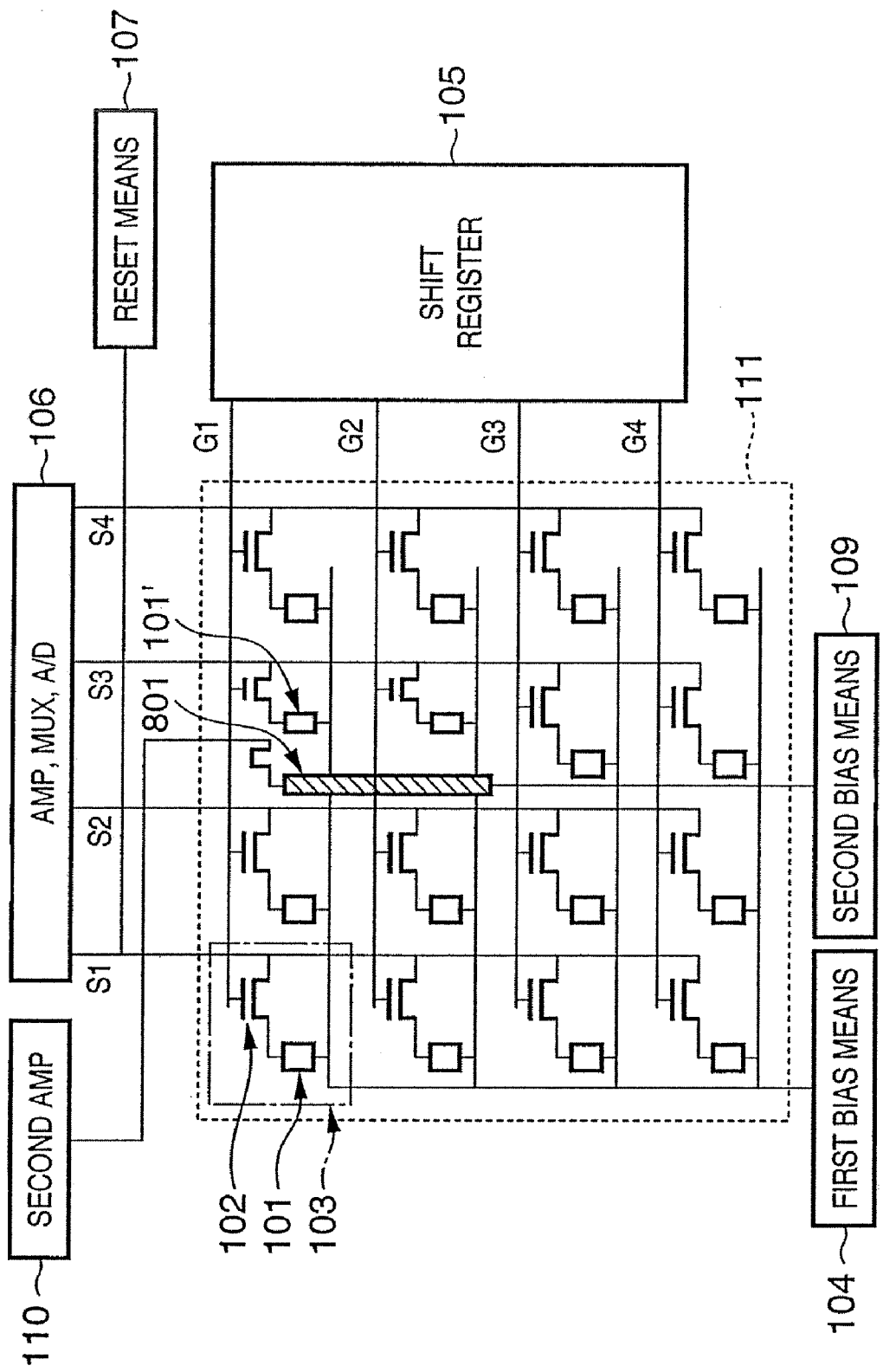
FIG. 8 is a circuit diagram of a radiation image sensing apparatus according to the sixth embodiment of the present invention.

FIG. 8 is a circuit diagram of a radiation image sensing apparatus of this embodiment. Note that the same reference numerals denote the same building components as those described in FIG. 1 of the first embodiment, and differences from the first embodiment will be described below.

In this embodiment, first photoelectric conversion elements, which are arranged in a given column, and do not neighbor a second photoelectric conversion element 801 as an AEC controls sensor, have the same size as that of a normal pixel.

With this structure, the number of pixels, in which the outputs from the first photoelectric conversion elements must be corrected since they have smaller areas, can be reduced.

Seventh Embodiment

The seventh embodiment of the present invention will be described below with reference to FIG. 9.

Figure 9:
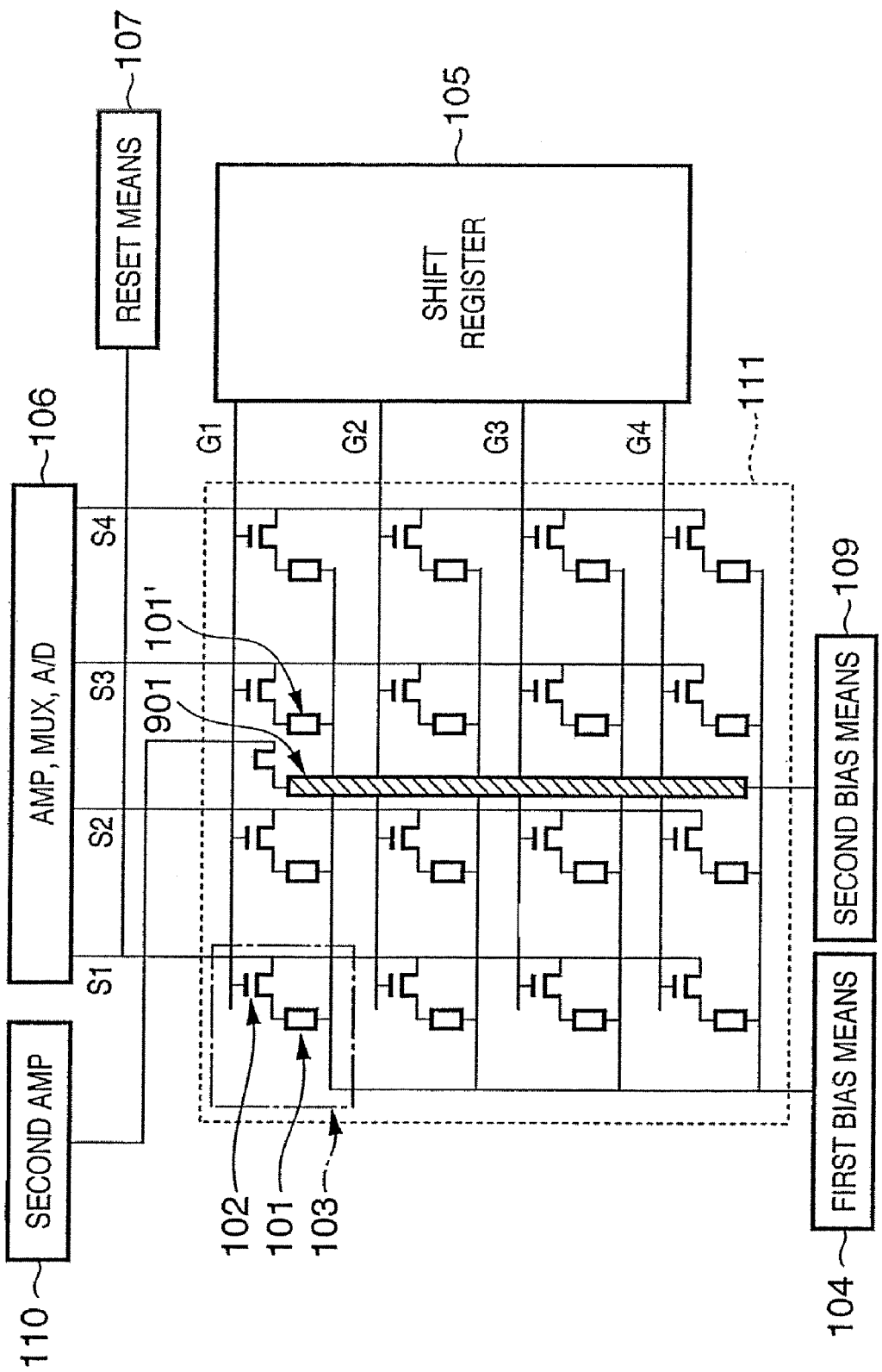
FIG. 9 is a circuit diagram of a radiation image sensing apparatus according to the seventh embodiment of the present invention.
Figure 12A:
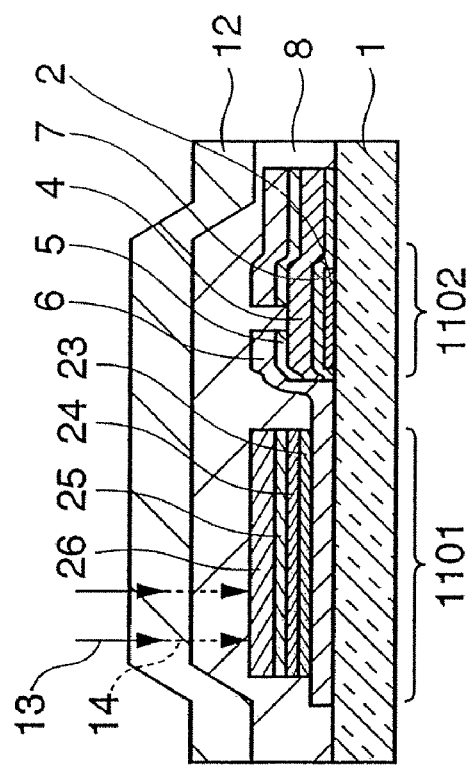
FIGS. 12A and 12B are respectively a plan view and sectional view of building components corresponding to one pixel of the conventional 2D area sensor shown in FIG. 11.
Figure 12B:
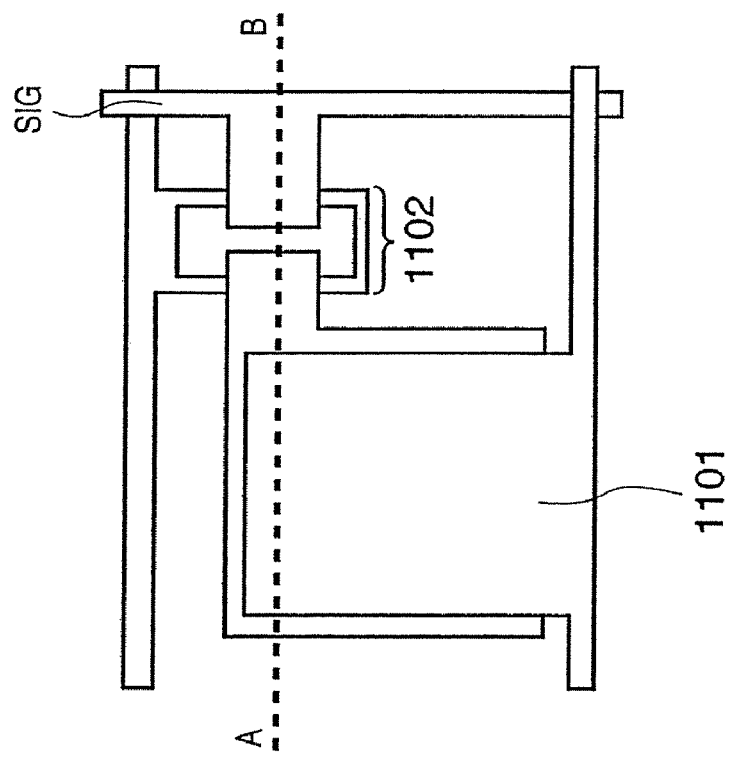

FIG. 9 is a circuit diagram of a radiation image sensing apparatus of this embodiment. Note that the same reference numerals denote the same building components as those described in FIG. 1 of the first embodiment, and differences from the first embodiment will be described below.

In this embodiment, a second photoelectric conversion element 901 has the same length or width as that of a first photoelectric conversion element forming region, and first photoelectric conversion elements have the same size in all pixels.

Since the first photoelectric conversion elements have the same size in all pixels, the need for output correction due to different element sizes of the first photoelectric conversion elements can be obviated.

Eighth Embodiment

The eighth embodiment of the present invention will be described below with reference to FIG. 10.

FIG. 10 is a circuit diagram of a radiation image sensing apparatus of this embodiment. Note that the same reference numerals denote the same building components as those described in FIG. 1 of the first embodiment, and differences from the first embodiment will be described below.

In this embodiment, a second photoelectric conversion element for AEC control is locally formed in a first photoelectric conversion element forming region, and the first photoelectric conversion elements have the same size in all pixels.

Since the first photoelectric conversion elements have the same size in all pixels, the need for output correction due to different element sizes of the first photoelectric conversion elements can be obviated.

Ninth Embodiment

The ninth embodiment of the present invention will be described below with reference to FIG. 14 and FIGS. 15A and 15B.

Figure 14:
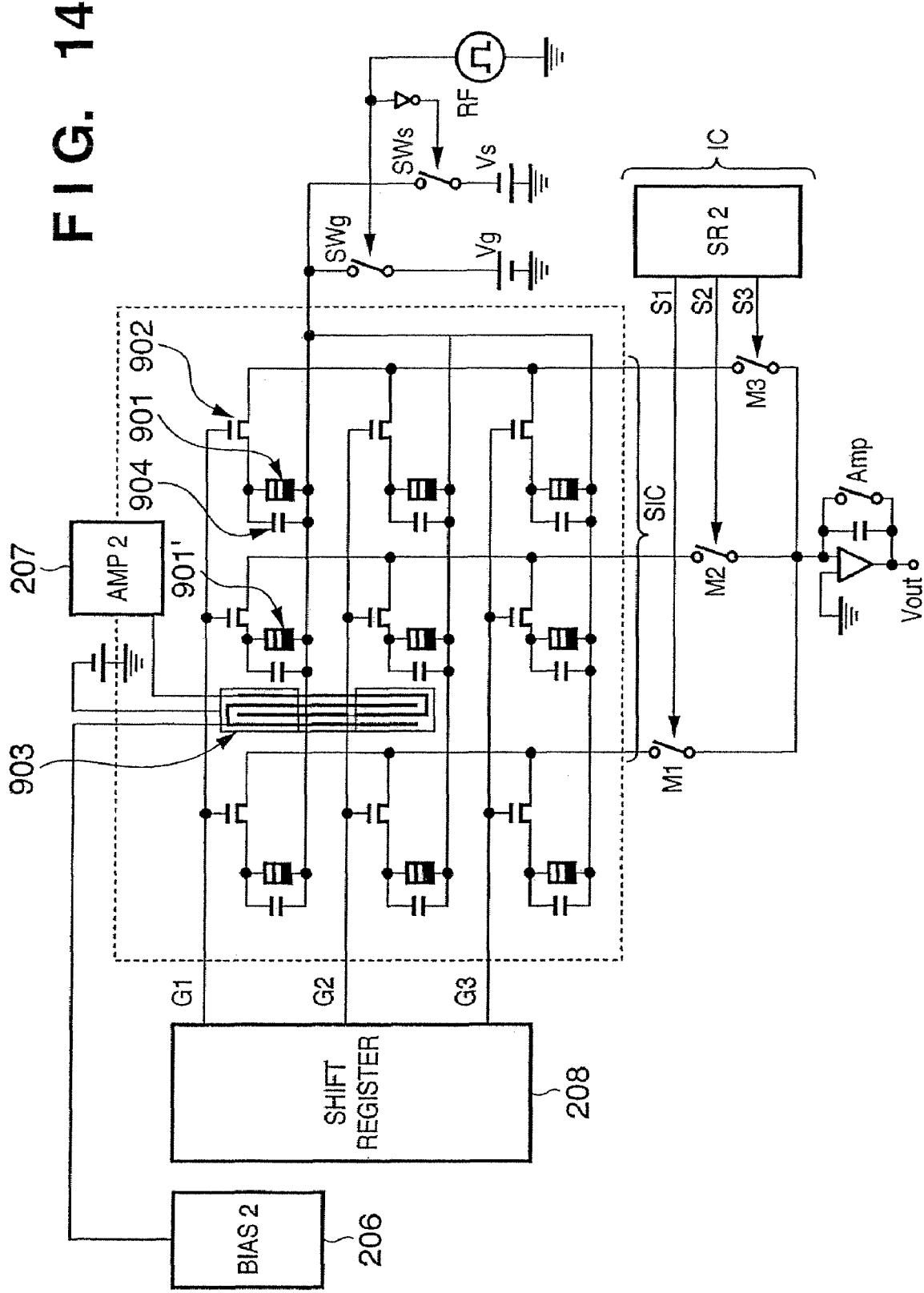
FIG. 14 is a circuit diagram of a radiation image sensing apparatus according to the ninth embodiment of the present invention.

FIG. 14 is a circuit diagram of a radiation image sensing apparatus of this embodiment. FIGS. 15A and 15B are respectively a plan view and sectional view of building components corresponding to one pixel of the radiation image sensing apparatus; FIG. 15A is a plan view and FIG. 15B is a sectional view.

In this embodiment, a first photoelectric conversion element 901 has an MIS structure, and a switch element 902 comprises a TFT. In the radiation image sensing apparatus, the first photoelectric conversion element 901, the switch element 902, and a capacitor 904 form one pixel. A second photoelectric conversion element 903 has a TFT structure, and its gate (lower metal) is applied with a bias to be a given potential.

In this embodiment as well, first photoelectric conversion elements 901' which neighbor a second photoelectric conversion element 903 have an area smaller than those of other first photoelectric conversion element 901.

The source or drain electrode of the second photoelectric conversion element 903 is connected to a second bias power supply (Bias2) 206, need not be selected by a shift register 208 upon reading out a charge, and is always applied with a bias to output a charge in accordance with the amount of incoming light. The gate electrode is set at a given potential, i.e., is applied with a negative bias in FIG. 14. A charge generated by the second photoelectric conversion element 903 is amplified by an amplifier (AMP2) 207.

Figure 15A:
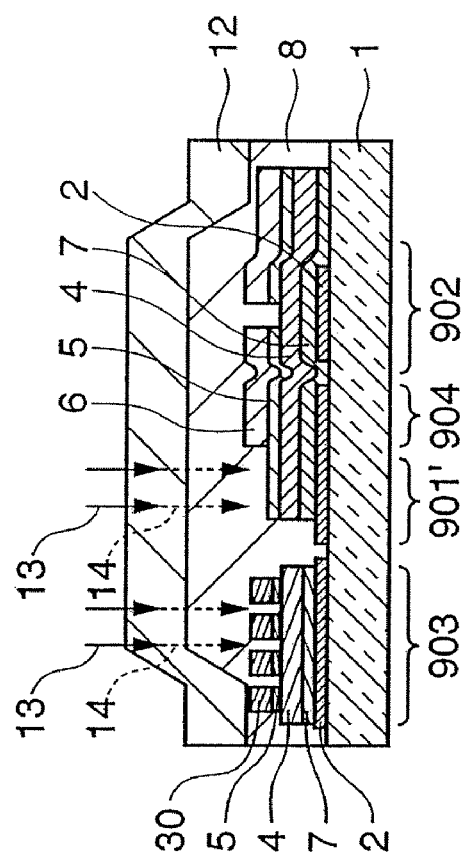
FIGS. 15A and 15B are respectively a plan view and sectional view of building components corresponding to one pixel of the radiation image sensing apparatus of the ninth embodiment.
Figure 15B:
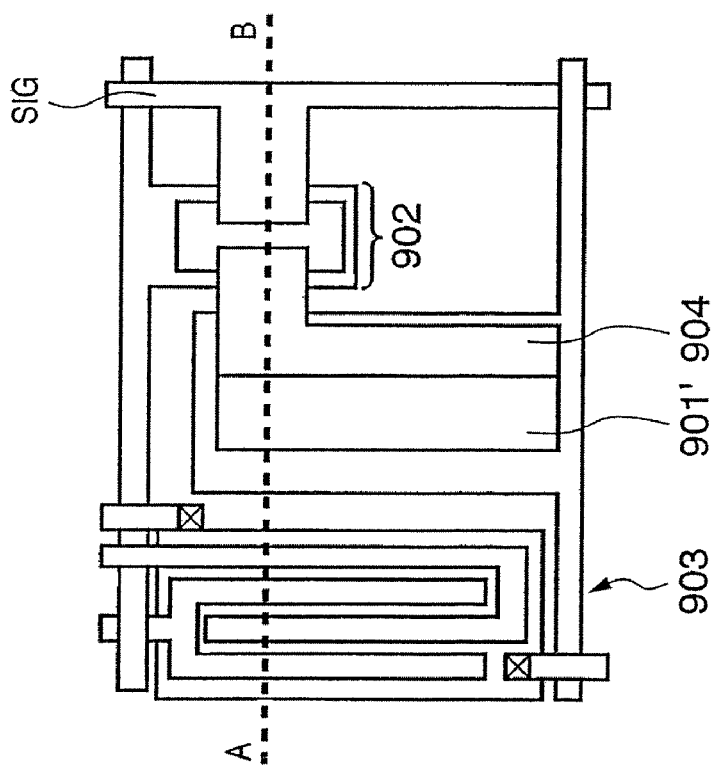

FIGS. 15A and 15B are respectively a plan view and sectional view of one pixel which includes the second photoelectric conversion element 903, and its neighboring first photoelectric conversion element 901'; FIG. 15A is a plan view and FIG. 15B is a sectional view. The same formation method as that described in the third embodiment can be used to form a structure that leaves the gate (lower electrode) of the second photoelectric conversion element.

In order to improve durability, a passivation film 8 of, e.g., a silicon nitride film (SiN) or the like is formed on the respective elements to cover them, and a phosphor 12, which is made up of CsI, $Gd_2O_2S$, or the like and serves as a waveform converter, is further formed.

In this embodiment, the second photoelectric conversion element 903 has the same layer structure as that of the TFT that serves as the switch element 902 to simply the fabrication process. Also, the second photoelectric conversion element 903 with stable characteristics can be obtained.

Processing circuits that apply a bias to the source/drain, a bias to the gate, amplify a signal, and so forth in association with the second photoelectric conversion element 903 are preferably formed near a side close to the forming region of the second photoelectric conversion element 903, thus allowing easy wiring layout.

10th Embodiment

The 10th embodiment of the present invention will be described below with reference to FIG. 1.

FIG. 1 is a circuit diagram of a radiation image sensing apparatus of this embodiment. As shown in FIG. 1, the radiation image sensing apparatus of this embodiment comprises a 2D matrix of a total of 16 pixels 103, i.e., 4 cells in the vertical direction×4 cells in the horizontal direction. Each pixel 103 comprises a first photoelectric conversion element 101, and a transistor 102, which is connected to the element 101 and serves as a transfer switch element.

The first photoelectric conversion elements 101 are connected to a first bias means 104, and the gates of the transistors 102 are connected to a shift register 105 via gate lines G1 to G4 for respective rows. Output signals of the transistors 102 are transferred to an amplifier/multiplexer/A/D converter 106 via signal lines S1 to S4 for respective columns, and undergo signal processes in turn. A reset means 107 is connected to the signal lines S1 to S4 of the transistors 102 for respective columns.

Furthermore, an elongated second photoelectric conversion element 108, hatched in FIG. 1, is arranged. The second photoelectric conversion element 108 has a shape different from those of the first photoelectric conversion elements 101 used to sense a normal image.

The first photoelectric conversion elements 101 correspond to gray element portions in FIG. 1, which are arranged at equal pitches p in a 4×4 2D matrix, and are connected to the first bias means 104.

Charges generated by the first photoelectric conversion elements 101 corresponding to a row selected by the shift register 105 are read out via the transistors 102, are transferred to the amplifier/multiplexer/A/D converter 106, are selectively amplified by the amplifier (AMP), and are then converted by the A/D converter.

After the charges are read out, the reset means 107 executes a charge reset operation. Note that this operation is not necessary depending on the structure of the radiation image sensing apparatus.

The second photoelectric conversion element 108 is arranged in an elongated shape among the pixels 103 and between the signal lines (S2 and S3) in the column direction. Since the second photoelectric conversion element 108 is flush with the first photoelectric conversion elements 101, first photoelectric conversion elements 101' which neighbor the second photoelectric conversion element 108 have an area smaller than those of other first photoelectric conversion elements 101.

The second photoelectric conversion element 108 is connected to a second bias means 109. Upon reading out a charge, the second photoelectric conversion element 108 can always output a charge according to the amount of incoming light without being selected by the shift register 105. For this purpose, the second photoelectric conversion element 108 is always applied with a constant potential. In this case, since the second photoelectric conversion element 108 is formed independently of pixels, a charge can be read out from it without using the shift register. A charge detected by the second photoelectric conversion element 108 is amplified by a second amplifier (AMP) 110, and a total dose of radiation is detected by adding the output from the second amplifier 110.

According to this embodiment, since an AEC control sensor (second photoelectric conversion element 108) is formed in a photoelectric conversion substrate 111, it need not be independently arranged, a radiation detection apparatus can be made compact, and the circuit arrangement can be simplified. Since the AEC control sensor has an arrangement independent from a sensor (first photoelectric conversion elements) used to acquire image information, and independent processing circuit units are arranged, the need for reading out a charge by high-speed driving can be obviated, thus preventing deterioration of the image quality of a sensed image.

Since the AEC control sensor (second photoelectric conversion element 108) is laid out to run across a plurality of pixels in a direction perpendicular to driving lines in the row direction, i.e., in a direction parallel to the signal lines S1 to S4 in the column direction, so as not to form any intersections with the signal lines S1 to S4 in the column direction, an extra capacitance can be prevented from being parasitic on the signal lines S1 to S4, thus allowing to read out output signals with a high S/N ratio. Since the AEC control sensor is laid out to run across a plurality of pixels in a direction parallel to the signal lines, the radiation dose can be detected on the average of a broader region.

11th Embodiment

The 11th embodiment of the present invention will be described below with reference to FIG. 16.

Figure 16:
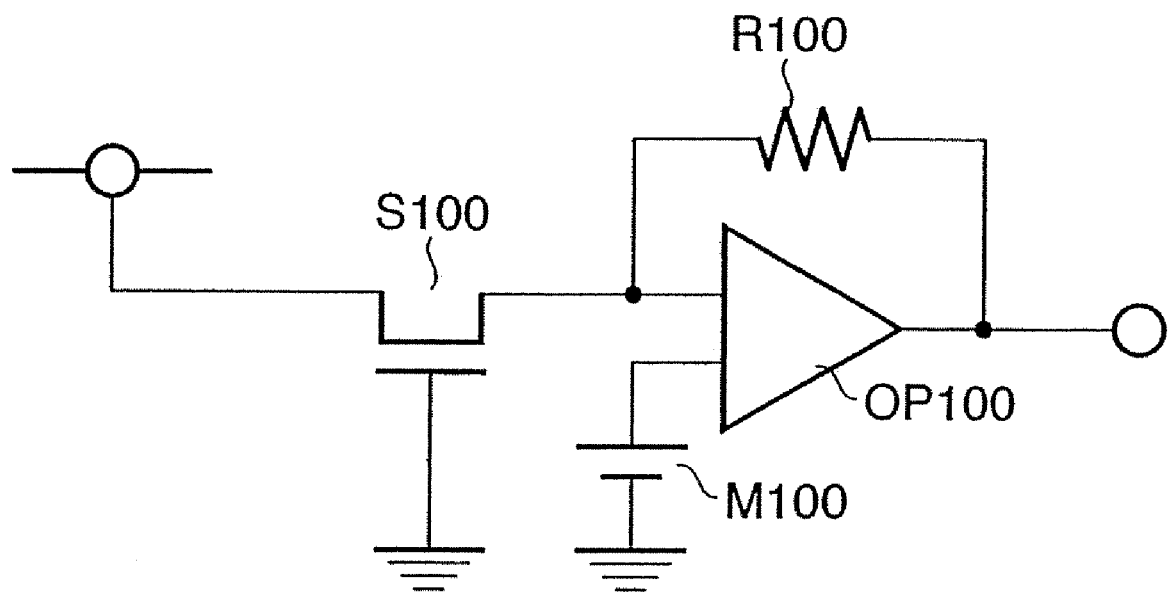
FIG. 16 is a circuit diagram of a radiation image sensing apparatus according to the 11th embodiment of the present invention.

FIG. 16 shows a driving circuit unit and processing circuit unit when the second photoelectric conversion element 903 shown in FIG. 14 is a TFT sensor. As shown in FIG. 16, the radiation image sensing apparatus of this embodiment comprises a TFT second photoelectric conversion element S100, operational amplifier OP100, power supply M100, and feedback resistor R100.

As a driving method of the radiation image sensing apparatus, a bias is applied across the source and drain electrodes of the TFT second photoelectric conversion element S100 to fix the gate electrode at a given potential.

Subsequently, when signal light enters in this state, a photocurrent is generated, and a positive signal charge (hole) flows into the feedback resistor R100. Hence, this photocurrent can be read at the output terminal of the operational amplifier OP100. At this time, by connecting the power supply M100 to the non-inverting input terminal of the operational amplifier OP100, the potential of the source electrode of the TFT second photoelectric conversion element S100 can be set to be equal to that of the power supply M100.

12th Embodiment

The 12th embodiment of the present invention will be described below with reference to FIG. 17.

Figure 17:
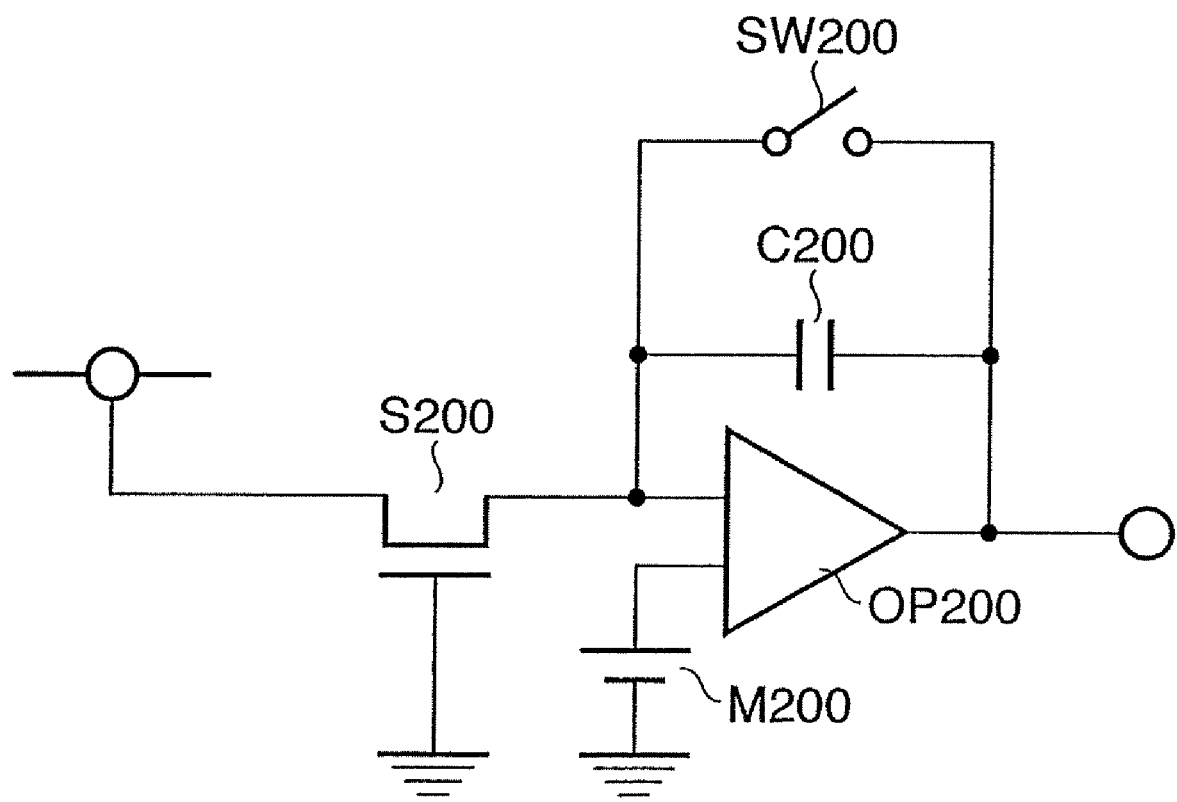
FIG. 17 is a circuit diagram of a radiation image sensing apparatus according to the 12th embodiment of the present invention.

FIG. 17 shows a driving circuit unit and processing circuit unit when the second photoelectric conversion element 903 shown in FIG. 14 is a TFT sensor, as another aspect of the 10th embodiment. As shown in FIG. 17, the radiation image sensing apparatus of this embodiment comprises a TFT second photoelectric conversion element S200, operational amplifier OP200, power supply M200, switch SW200, and feedback resistor R200.

As a driving method of the radiation image sensing apparatus, a bias is applied across the source and drain electrodes of the TFT second photoelectric conversion element S200 to fix the gate electrode at a given potential.

Subsequently, when signal light enters in this state, a photocurrent is generated, and a positive signal charge (hole) flows into the feedback resistor R200. Hence, the total charge amount of accumulated positive signal charges (holes) can be read at the output terminal of the operational amplifier OP200. At this time, the switch SW200 is open. Also, by connecting the power supply M200 to the non-inverting input terminal of the operational amplifier OP200, the potential of the source electrode of the TFT second photoelectric conversion element S200 can be set to be equal to that of the power supply M200.

After the total charge amount of accumulated positive signal charges (holes) is read at the output terminal of the operational amplifier OP200, the switch SW200 is closed to reset the accumulated total charge.

13th Embodiment

The 13th embodiment of the present invention will be described below with reference to FIG. 18.

Figure 18:
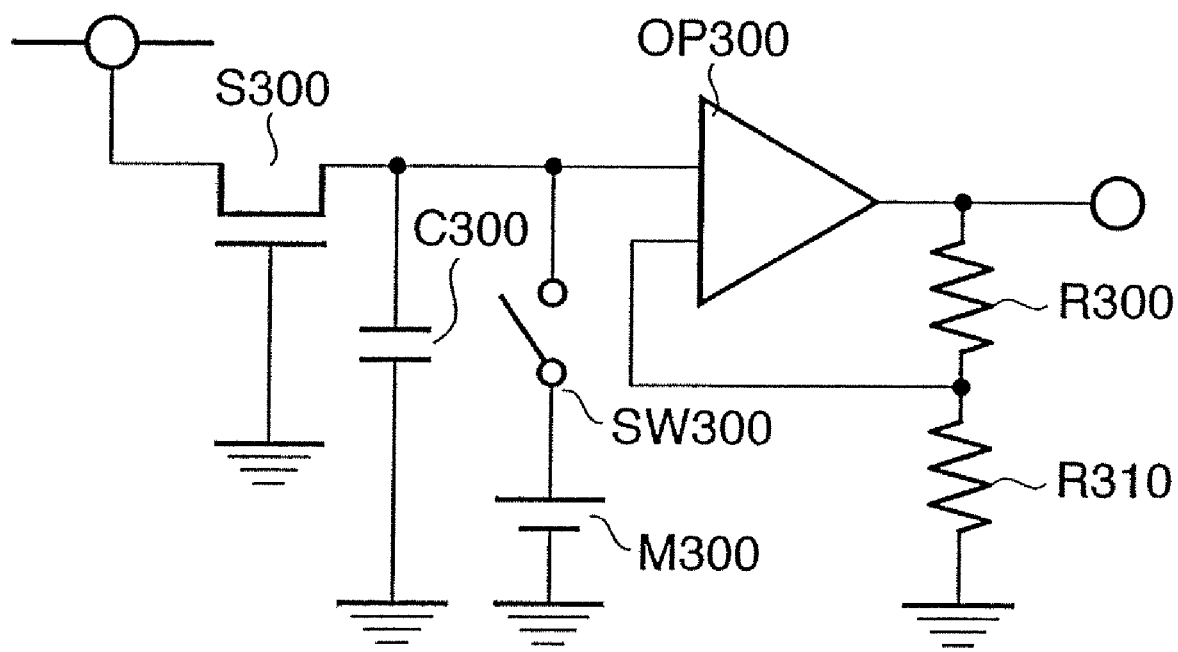
FIG. 18 is a circuit diagram of a radiation image sensing apparatus according to the 13th embodiment of the present invention.

FIG. 18 shows a driving circuit unit and processing circuit unit when the second photoelectric conversion element 903 shown in FIG. 14 is a TFT sensor, as still another aspect of the 10th embodiment. As shown in FIG. 18, the radiation image sensing apparatus of this embodiment comprises a TFT second photoelectric conversion element S300, operational amplifier OP300, power supply M300, switch SW300, and feedback resistors R300 and R310.

As a driving method of the radiation image sensing apparatus, a bias is applied across the source and drain electrodes of the TFT second photoelectric conversion element S300 to fix the gate electrode at a given potential.

Subsequently, when signal light enters in this state, a photocurrent is generated, and positive signal charges (holes) are accumulated on a cumulative capacitor C300. Hence, since the potential of the total charge amount of accumulated positive signal charges (holes) can be amplified at a gain of ((R300+R310)/R310), the amplified potential can be read at the output terminal of the operational amplifier OP300. At this time, the switch SW300 is open.

After the amplified potential is read at the output terminal of the operational amplifier OP300, the switch SW300 is closed to reset the accumulated total charge, and the source electrode of the TFT second photoelectric conversion element S300 is fixed at a given potential of the power supply M300.

14th Embodiment

The 14th embodiment of the present invention will be described below with reference to FIG. 19.

Figure 19:
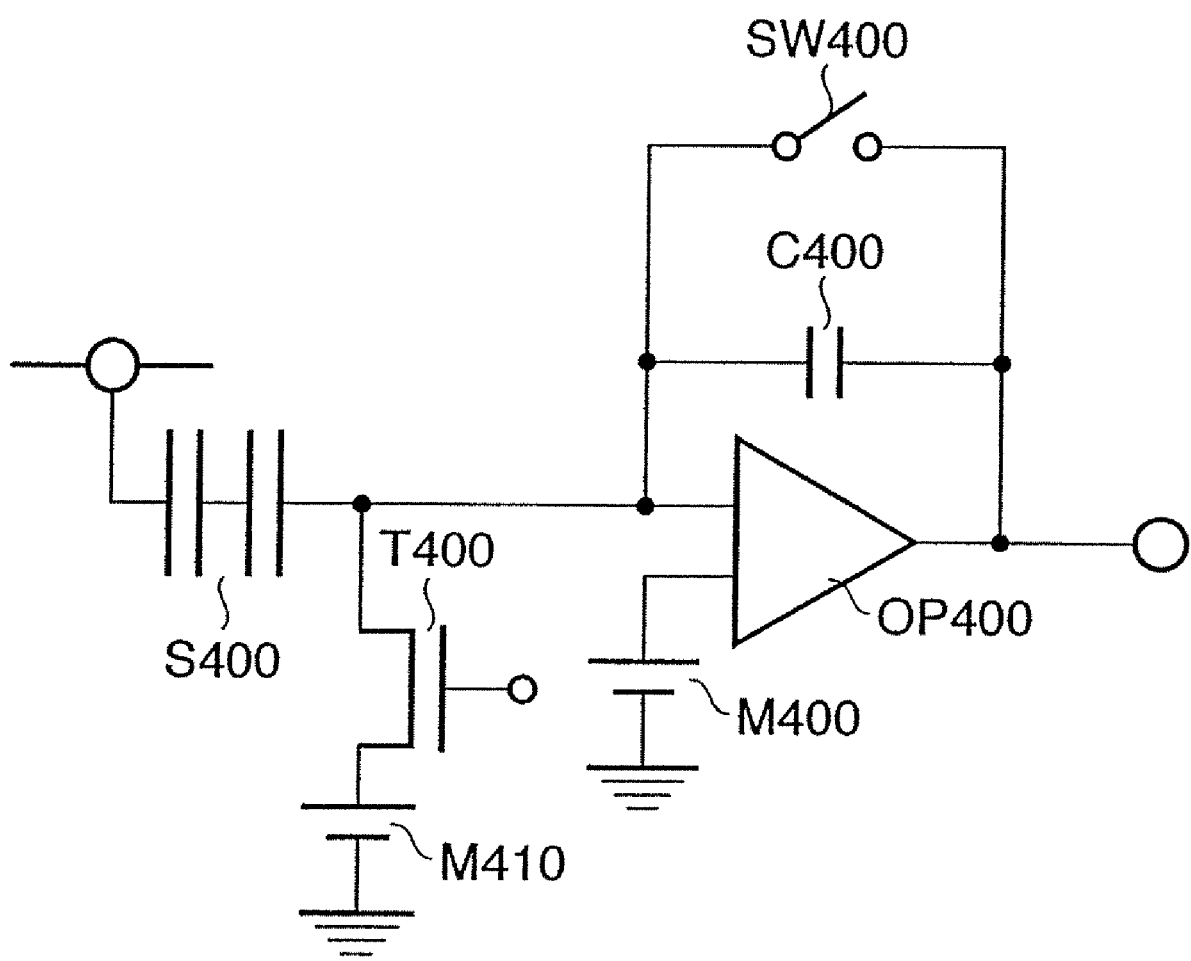
FIG. 19 is a circuit diagram of a radiation image sensing apparatus according to the 14th embodiment of the present invention.

FIG. 19 shows a driving circuit unit and processing circuit unit when the second photoelectric conversion element S200 shown in FIG. 17 is an MIS sensor. As shown in FIG. 19, the radiation image sensing apparatus of this embodiment comprises a TFT second photoelectric conversion element S400, operational amplifier OP400, power supply M400, transistor T400, switch SW400, and feedback capacitor C400.

As a driving method of the radiation image sensing apparatus, a bias is applied across the upper and lower electrodes of the MIS second photoelectric conversion element S400.

Subsequently, when signal light enters in this state, a photocurrent is generated, and a positive signal charge (hole) flows into the feedback capacitor C400. Hence, the total charge amount of accumulated positive signal charges (holes) can be read at the output terminal of the operational amplifier OP400. At this time, the switch SW400 is open. Also, by connecting the power supply M400 to the non-inverting input terminal of the operational amplifier OP400, the potential of the source electrode of the MIS second photoelectric conversion element S400 can be set to be equal to that of the power supply M400.

After the total charge amount of accumulated positive signal charges (holes) is read at the output terminal of the operational amplifier OP400, the switch SW400 is closed to reset (refresh) a photocharge accumulated on the MIS second photoelectric conversion element S400.

15th Embodiment

The 15th embodiment of the present invention will be described in detail below with reference to the accompanying drawings.

FIG. 1 is a circuit diagram of a radiation image sensing apparatus of this embodiment.

As shown in FIG. 1, the radiation image sensing apparatus of this embodiment comprises a conversion means formed by arranging, two-dimensionally (in a matrix), a large number of pixels 103, each of which comprises a first photoelectric conversion element 101, and a transistor 102, which is connected to the element 101 and serves as a transfer switch element, on a glass substrate, and a total dose detection means which has a second photoelectric conversion element 108, and a second amplifier (AMP) 110 that is connected to the element 108 and detects the total dose of radiation that enters the conversion means. In this embodiment, FIG. 1 illustrates a total of 16 pixels, i.e., 4 cells in the vertical direction×4 cells in the horizontal direction, for the sake of simplicity.

The first photoelectric conversion elements 101 are connected to a first bias means 104, and the gates of the transistors 102 are connected to a shift register 105 via gate lines G1 to G4 for respective rows. Output signals of the transistors 102 are transferred to an amplifier/multiplexer/A/D converter 106 via signal lines S1 to S4 for respective columns, and undergo signal processes in turn. A reset means 107 is connected to the signal lines S1 to S4 of the transistors 102 for respective columns.

Furthermore, the elongated second photoelectric conversion element 108, hatched in FIG. 1, is arranged. The second photoelectric conversion element 108 has a shape different from those of the first photoelectric conversion elements 101 used to sense a normal image.

The first photoelectric conversion elements 101 correspond to gray element portions in FIG. 1, which are arranged at equal pitches p in a 4×4 2D matrix, and are connected to the first bias means 104.

Charges generated by the first photoelectric conversion elements 101 corresponding to a row selected by the shift register 105 are read out via the transistors 102, are transferred to the amplifier/multiplexer/A/D converter 106, are selectively amplified by the amplifier (AMP), and are then converted by the A/D converter.

After the charges are read out, the reset means 107 executes a charge reset operation. Note that this operation is not necessary depending on the structure of the radiation image sensing apparatus.

The second photoelectric conversion element 108 is arranged in an elongated shape among the pixels 103 and between the signal lines (S2 and S3) in the column direction. Since the second photoelectric conversion element 108 is flush with the first photoelectric conversion elements 101 to have the same layer structure, first photoelectric conversion elements 101' which neighbor the second photoelectric conversion element 108 have an area smaller than those of other first photoelectric conversion elements 101.

The second photoelectric conversion element 108 is connected to a second bias means 109. Upon reading out a charge, the second photoelectric conversion element 108 can always output a charge according to the amount of incoming light without being selected by the shift register 105. For this purpose, the second photoelectric conversion element 108 is always applied with a constant potential. A charge detected by the second photoelectric conversion element 108 is amplified by the second amplifier (AMP) 110, and a total dose of radiation is detected by adding the output from the second amplifier 110.

According to this embodiment, since an AEC control sensor (second photoelectric conversion element 108) is formed in a photoelectric conversion substrate 111, it need not be independently arranged, a radiation detection apparatus can be made compact, and the circuit arrangement can be simplified. Since the AEC control sensor has an arrangement independent from a sensor (first photoelectric conversion elements) used to acquire image information, and a processing circuit unit is independently arranged, the need for reading out a charge by high-speed driving can be obviated, thus preventing deterioration of the image quality of a sensed image.

Since the AEC control sensor (second photoelectric conversion element 108) is laid out to run across a plurality of pixels in a direction parallel to the signal lines S1 to S4 in the column direction so as not to form any intersections with the signal lines S1 to S4 in the column direction, an extra capacitance can be prevented from being parasitic on the signal lines S1 to S4, thus allowing to read out output signals with a high S/N ratio.

The driving operation and signal process of the second photoelectric conversion element will be described below.

Figure 20:
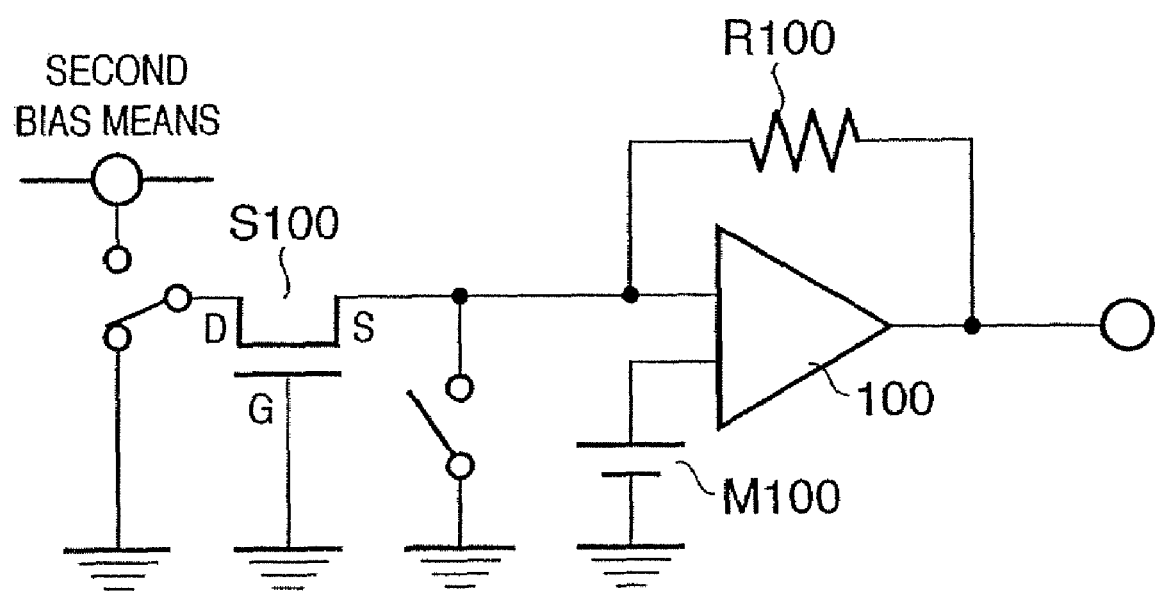
FIG. 20 is a circuit diagram showing a processing circuit unit of a second photoelectric conversion element in the 15th embodiment of the present invention.

FIG. 20 shows a processing circuit unit when the second photoelectric conversion element shown in FIG. 1 is a TFT sensor.

Reference numeral S100 denotes a TFT second photoelectric conversion element; D, a drain electrode; S, a source electrode; and G, a gate electrode. Reference numeral 110 denotes the second amplifier (AMP: operational amplifier) in FIG. 1; M100, a power supply; and R100, a feedback resistor.

As an actual driving method, a bias is applied across the source and drain electrodes of the TFT second photoelectric conversion element S100 to fix the gate electrode at a given potential.

When signal light enters in this state, a photocurrent is generated, and a positive signal charge (hole) flows into the feedback resistor R100. Hence, the photocurrent can be read at the output terminal of the second amplifier 110. At this time, by connecting the power supply M100 to the non-inverting input terminal of the second amplifier 110, the potential of the source electrode of the TFT second photoelectric conversion element S100 can be set to be equal to that of the power supply M100.

The second photoelectric conversion element S100 is set OFF at the output timing of image information read by the first photoelectric conversion elements 101 by fixing the potentials of the respective electrodes of the second photoelectric conversion element S100 at a ground (GND) potential or a constant potential, so as not to influence signals of the first photoelectric conversion elements 101, which are formed around the element S100.

In this way, the influence on the operation for outputting signals read by the first photoelectric conversion elements 101 as image information can be eliminated.

Also, by reading the output from the AEC sensor (photoelectric conversion element S100) as a current using the second amplifier 110, not only an X-ray dose suited to image formation can be obtained by stopping X-ray radiation based on the output from the photoelectric conversion element S100, but also the stop timing of generated X-rays can be obtained.

16th Embodiment

The 16th embodiment of the present invention will be described below.

Figure 21:
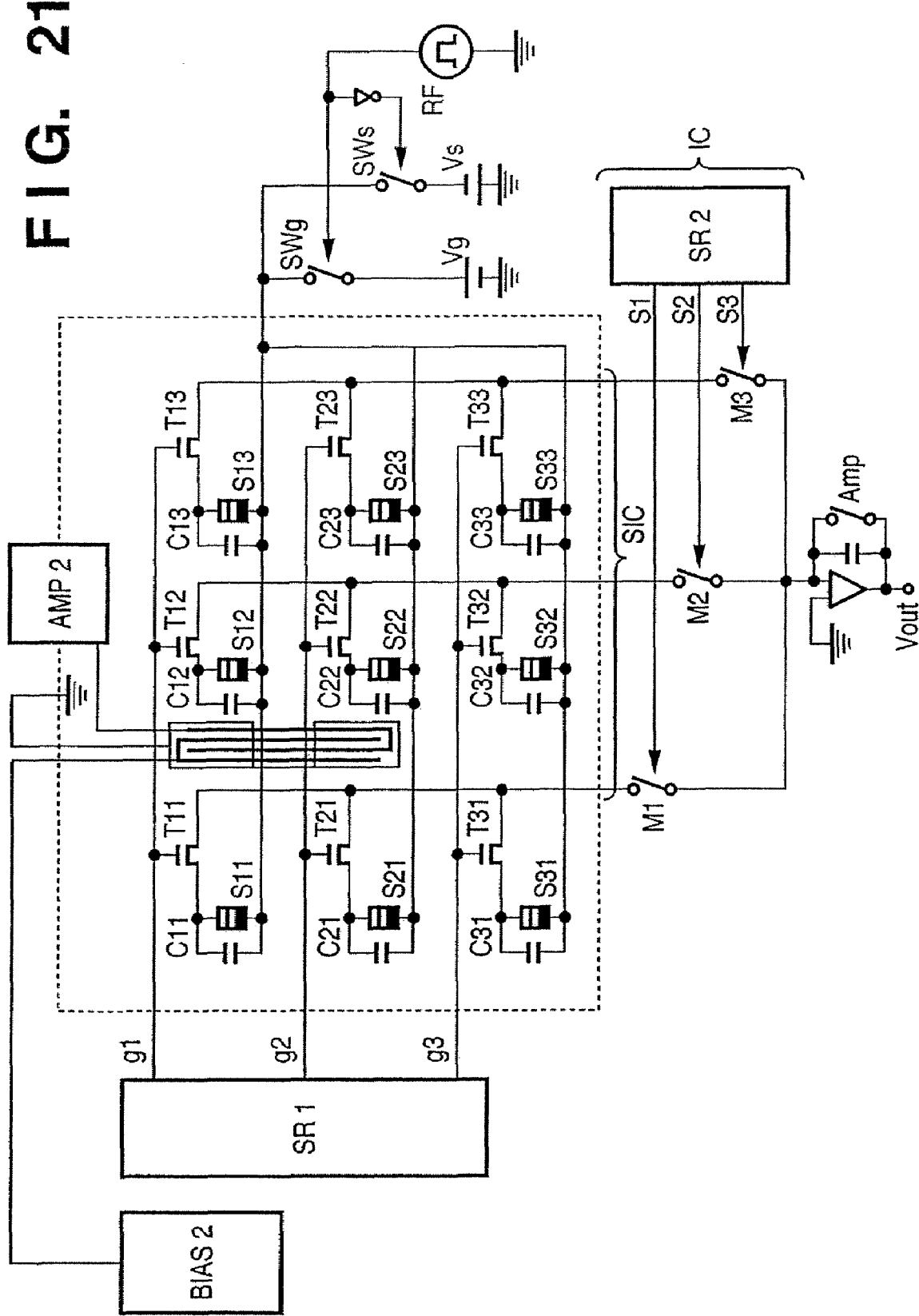
FIG. 21 is a circuit diagram of a radiation image sensing apparatus according to the 16th embodiment of the present invention.
Figure 22:
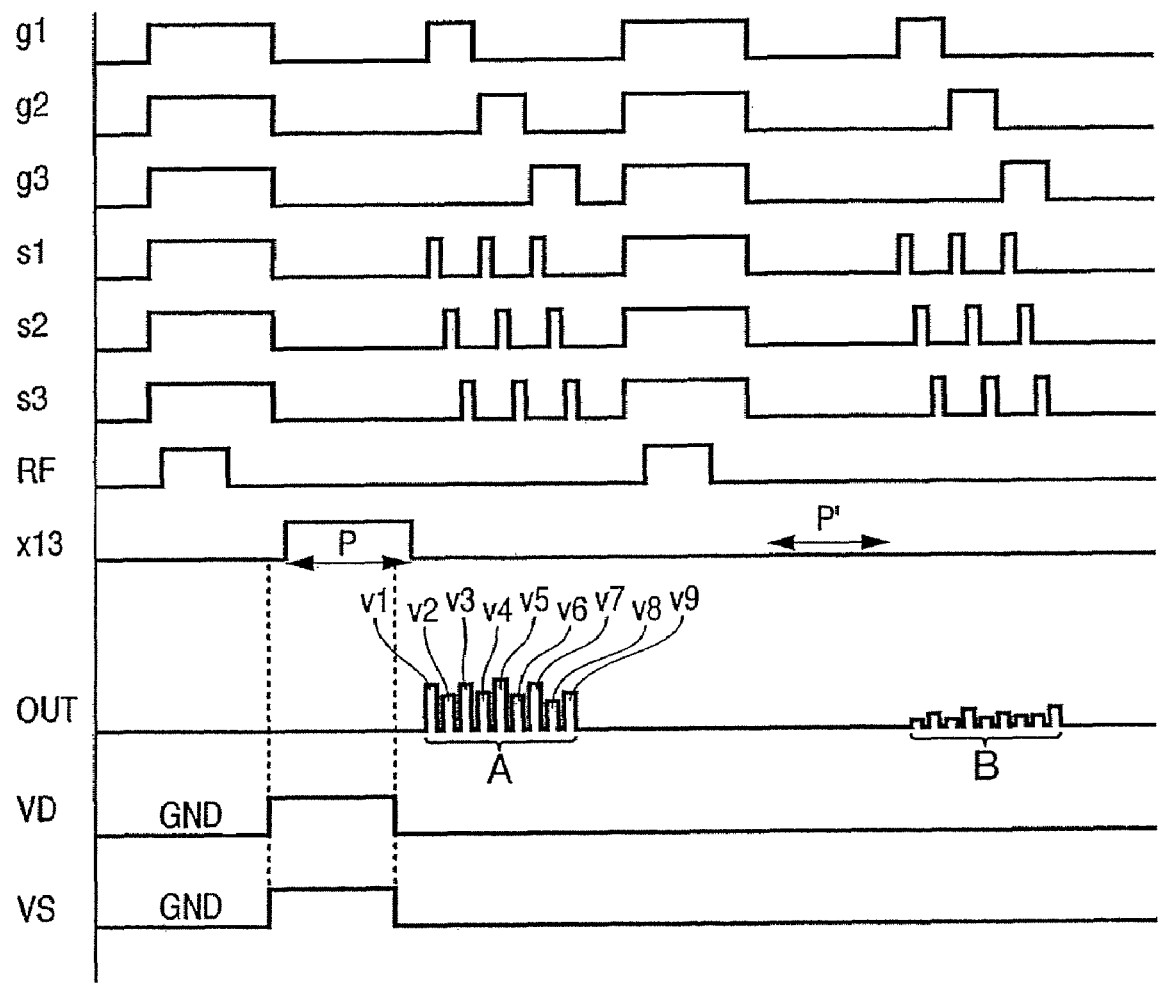
FIG. 22 is a timing chart of a radiation image sensing apparatus according to the 16th embodiment of the present invention.

FIG. 21 is a circuit diagram of a radiation image sensing apparatus of this embodiment. FIG. 22 is a timing chart of the radiation image sensing apparatus of this embodiment. FIGS. 15A and 15B are respectively a plan view and sectional view of building components corresponding to one pixel of the radiation image sensing apparatus; FIG. 15A is a plan view and FIG. 15B is a sectional view taken along a broken line A-B in FIG. 15A.

Referring to FIG. 21, reference numerals S11 to S33 denote photoelectric conversion elements; C11 to C33, cumulative capacitors; and T11 to T33, transfer TFTs. Reference symbol Vs denotes a read power supply; and Vg, a refresh power supply. These power supplies Vs and Vg are respectively connected to all the photoelectric conversion elements S11 to S33 via switches SWs and SWg. The switches SWs is connected to a refresh control circuit RF via an inverter, and the switch SWg is directly connected to it. These switches are controlled by the refresh control circuit RF, so that the switch SWg is turned on during a refresh period, and the switch SWs is turned on during the remaining period. One pixel is formed by one photoelectric conversion element, capacitor, and TFT, and its signal output is connected to a detection integrated circuit IC via a signal line SIG. In a 2D area sensor of this embodiment, a total of nine pixels are divided into three blocks, and the outputs from three pixels per block are simultaneously transferred, and are sequentially converted and output by the detection integrated circuit via the signal line. By arranging three pixels per block in the horizontal direction, and arranging three blocks in turn in the vertical direction, the pixels are arranged two-dimensionally.

A second photoelectric conversion element is arranged between the photoelectric conversion elements S11 and S21, and photoelectric conversion elements S12 and S22. The second photoelectric conversion element has an elongated, combtooth shape, which is different from the shapes of the first photoelectric conversion elements S11 to S22 used to sense a normal image.

Note that the second photoelectric conversion element in FIG. 21 is a TFT sensor.

The drain electrode of the second photoelectric conversion element in FIG. 21 is connected to a bias power supply (Bias2), and its source electrode is connected to an amplifier (AMP2), which amplifies and outputs a charge generated in accordance with the amount of incoming light of radiation.

At this time, since the gate electrode potential is fixed to be negative with respect to the source electrode potential, a larger ratio between the photocurrent and dark current can be obtained. The larger ratio between the photocurrent and dark current can improve the performance of the second photoelectric conversion element.

FIGS. 15A and 15B are respectively a plan view and sectional view of the photoelectric conversion elements S12 and S22.

In FIGS. 15A and 15B, reference numeral S0 denotes the second photoelectric conversion element for an AEC sensor. The second photoelectric conversion element has the same layer structure as the photoelectric conversion element (S11), capacitor (C11), and TFT (T1-1).

In this way, since the second photoelectric conversion element is used as an AEC sensor, the AEC sensor can be formed at low cost, and a low-cost image sensing apparatus can be provided.

A portion bounded by the broken line in FIG. 21 is formed on a single, large-area insulating substrate. Reference numeral S11 denotes a photoelectric conversion element; T11, a TFT; C11, a capacitor; and SIG, a signal line. In this embodiment, the capacitor C11 and photoelectric conversion element S11 are not specially isolated, and the capacitor C11 is formed by increasing the area of the electrode of the photoelectric conversion element S11.

A passivation silicon nitride film (SiN) 8 and a phosphor 12 of CsI, $Gd_2O_2S$, or the like are formed on the upper portion of a pixel. When X-rays 13 that contain image information enter from the upper surface of the structure, they are converted by the phosphor 12 into image information light 14, which enters the photoelectric conversion element.

The formation method of respective elements will be described in turn using FIGS. 15A and 15B.

A 50-nm thick Cr film is deposited on a glass substrate 1 of an insulating material by, e.g., sputtering to form a lower metal layer 2, which is patterned by photolithography to remove an unnecessary area by etching. As a result, the lower electrode of the photoelectric conversion element S11, the gate electrode of the TFT T11, and the lower electrode of the capacitor C11 are formed. Then, a 200-nm/500-nm/50-nm thick SiN (7)/i (4)/n (5) layers are respectively deposited by CVD in a single vacuum environment. These layers serve as an insulating layer/photoelectric conversion semiconductor layer/hole injection blocking layer of the photoelectric conversion element S11, a gate insulating film/semiconductor layer/ohmic contact layer of the TFT T11, and an interlayer of the capacitor C11. Also, these layers are used as cross-part insulating layers of the signal line. The thicknesses of the respective layers are not limited to such specific values, and are optimally designed depending on the voltage, current, charge, amount of incoming light, and the like used for a 2D area sensor. However, at least the SiN layer must have a thickness of 50 nm or more so as to block electrons and holes and to serve as a gate insulating film of the TFT.

After these layers are deposited, a 1,000-nm thick Al film is deposited by, e.g., sputtering. Furthermore, the resultant structure is patterned by photolithography to remove an unnecessary area by etching. With this process, the upper electrode of the photoelectric conversion element S11, the source and drain electrodes as main electrodes of the TFT T11, the upper electrode of the capacitor C11, and the signal line SIG are formed.

Furthermore, the n-layer in only a channel portion of the TFT T11 is etched by RIE, and unnecessary portions of the SiN (7)/i (4)/n (5) layers are then removed by etching to isolate elements. In this manner, the photoelectric conversion element S11, TFT T11, and capacitor C11 are formed. The process for one pixel has been described, but other pixels are formed at the same time.

In order to improve durability, a passivation film 8 of, e.g., a silicon nitride film (SiN) or the like is formed on the respective elements to cover them, and a phosphor 12 of CsI, $Gd_2O_2S$, or the like is further formed.

As described above, in this embodiment, the photoelectric conversion element, TFT, capacitor, and signal line SIG can be formed by only the common lower metal layer 2, the SiN (7)/i (4)/n (5) layers, and the upper metal layer 6, which are deposited at the same time, and etching of respective layers. The photoelectric conversion element S11 has only one injection element layer, and can be formed in a single vacuum environment. Furthermore, the gate insulating film/i-layer interface, which is important in terms of the characteristics of the TFT, can be formed in a single vacuum environment. Moreover, since the interlayer of the capacitor C11 includes an insulating layer that suffers less leakage due to heat, a capacitor with satisfactory characteristics can be formed.

The operation of the radiation image sensing apparatus of this embodiment will be described below using the timing chart shown in FIG. 22.

A doctor or operator sets a patient to be examined, i.e., an object (not shown) at a position between an X-ray source (not shown) and 2D area sensor (not shown) and poses the object to be able to observe a portion to be examined. At the same time, the doctor or operator inputs conditions at a control panel (not shown) so as to obtain an optimal image sensing output in consideration of the symptom, physical attribute, and age of the patient obtained by doctor's questions or the like in advance, and information to be acquired. This signal is sent to an AE controller (not shown) as an electrical signal. At the same time, a condition memory circuit (not shown) stores the input condition.

In this state, when the doctor or operator presses an image sensing exposure start button (not shown), an image sensing mode starts. A system control circuit (not shown) controls the 2D area sensor (not shown) to execute a refresh operation. Shift registers SR1 and SR2 apply Hi signals to control lines g1 to g3, and s1 and s2. In response to these signals, the transfer TFTs T11 to T33, and switches M1 to M3 are enabled (turned on), and the D electrodes of all the photoelectric conversion elements S11 to S33 are set at GND potential (since the input terminal of an integral detector Amp is designed to be GND potential).

At the same time, the refresh control circuit RF outputs a Hi signal to turn on the switch SWg, and the G electrodes of all the photoelectric conversion elements S11 to S33 are set at a positive potential by the refresh power supply Vg. Then, all the photoelectric conversion elements S11 to S33 are set in a refresh mode, and are refreshed.

Subsequently, the refresh control circuit RF outputs a Lo signal to turn on the switch SWs, and the G electrode of all the photoelectric conversion elements S11 to S33 are set at a negative potential by the read power supply Vs. Then, all the photoelectric conversion elements S11 to S33 are set in a photoelectric conversion mode, and the capacitors C11 to C33 are reset at the same time. In this state, the shift registers SR1 and SR2 apply Lo signals onto the control lines g1 to g3, and s1 and s2. The transfer TFTs T11 to T33 and switches M1 to M3 are turned off, and the electrodes of all the photoelectric conversion elements S11 to S33 are opened in a DC manner but their potentials are held by the capacitors C11 to C33. However, since no X-rays enter all the photoelectric conversion elements S11 to S33 at this time, no photocurrents flow. In this way, the refresh operation ends.

During the refresh operation of the first photoelectric conversion elements, the potentials of the respective electrodes (source, drain, and gate) of a second photoelectric conversion element S100 shown in FIG. 21 and FIGS. 15A and 15B are fixed at GND or s given potential. As a result, the first photoelectric conversion elements of all the pixels are refreshed uniformly.

The respective electrodes (source, drain, and gate) of the second photoelectric conversion element S100 shown in FIGS. 20 and 21 are then set at potentials that allow photoelectric conversion. More specifically, the source electrode potential is set at around 3 V, the drain electrode potential is set at around 10 V, and the gate electrode potential is set at around 0 V.

In this state, when X-rays are generated, are transmitted through the object, and enter the phosphor, they are converted into light, and that light enters the first photoelectric conversion elements S11 to S33 and the second photoelectric conversion element S100.

When the total amount of light that has entered the second photoelectric conversion element S100 reaches a given threshold value, a signal that stops X-ray radiation is output, thus ending X-ray radiation. With this process, since the second photoelectric conversion element S100 ends its role, the potentials of the respective electrodes (source, drain, and gate) of the second photoelectric conversion element S100 shown in FIGS. 20 and 21 are fixed at GND or a given potential. Thus, the influence on the subsequent operation for outputting signals read by the first photoelectric conversion elements S11 to S33 as image information can be eliminated.

An actual operation will be described below with reference to the timing chart in FIG. 22.

Photocurrents, which flow in the first photoelectric conversion elements S11 to S33 in response to a given amount of light, are accumulated as charges in the capacitors C11 to C33, and are held after completion of X-ray radiation. The 2D area sensor then executes a read operation. When the shift register SR1 applies a Hi control pulse to the control line g1, and the shift register SR2 applies control pulses to the control lines s1 to s3, signals v1 to v3 are sequentially output via the transfer TFTs T11 to T13 and switches M1 to M3. Likewise, other light signals are output under the control of the shift registers SR1 and SR2. In this manner, 2D information of the inner structure of a human body or the like is obtained as signals v1 to v9. Note that signals v2, v5, and v8, which are output from the control line s2 via the switch M2, have smaller outputs than other signals since the areas of the first photoelectric conversion elements S12, S22, and S32 are smaller than other elements. However, these signals are finally compensated for later.

Since the first photoelectric conversion elements are driven in the same manner as in the prior art shown in FIG. 11 and do not require high-speed driving, a high-performance image sensing apparatus, which is free from any drop of image quality of a sensed image, can be consequently provided.

Also, since the size of the AEC control sensor can be reduced without using another commercially available AEC control sensor, a compact image sensing apparatus can be provided. Since the first and second photoelectric conversion elements can be formed to have the same layer structure using same thin films, a low-cost image sensing apparatus can be provided.

According to the present invention, since a second conversion element used to detect the total dose of radiation that enters a conversion unit is arranged on a single substrate independently of pixels having first conversion elements, which are arranged in the conversion unit that outputs image information, the need for reading out outputs from the first conversion elements at high speed for the purpose of input dose adjustment can be obviated, and no sensor for adjusting the dose is required, thus simplifying the structure of the radiation image sensing apparatus.

Furthermore, since the second conversion element is formed to have a TFT structure, and radiation detection of the second conversion element is disabled at the timing at which the first conversion elements output image information in accordance with the dose of radiation that has entered the first conversion elements in the conversion unit, i.e., since the potentials of the respective electrodes (source, drain, and gate) of the second photoelectric conversion element are fixed at GND or a given potential, the influence on the subsequent operation for outputting signals read by the first photoelectric conversion elements as image information can be eliminated.

Moreover, since the output from the second conversion element is read as a current using a processing circuit unit (operational amplifier), not only X-ray radiation is stopped in response to the output from the second conversion element to obtain an X-ray dose suited to image formation, but also the stop timing of generated X-rays can be obtained.

17th Embodiment

In this embodiment, a second conversion element, which is arranged independently of first conversion elements that detect signals used to read an image, is used as a sensor for detecting start/stop of a irradiation of radiation (to be referred to as an X-ray monitor hereinafter). This X-ray monitor, for example, is used deciding the timing that starts read-out of the sensor. In this case, a differential circuit in a read circuit is connected to the second conversion element to differentiate the detected signal, thereby detecting incidence and/or stop of radiation. Alternatively, a circuit shown in FIG. 18 can be used. The second conversion element may be either of TFT or MIS type. Note that the MIS type is of capacitance type that stores carriers in an insulating layer, and corresponds to a sensor disclosed in, e.g., U.S. Pat. No. 6,075,256.

Also, both a conversion element used to detect the total dose of radiation, which has been explained until the 16th embodiment, and an X-ray monitor conversion element can be formed on the substrate, or an element which has both functions may be formed in place of forming the two elements. In this case, a current read circuit shown in FIG. 18 can be used as the arrangement of a read circuit.

Other Embodiments of Present Invention

The present invention may be applied to either a system constituted by a plurality of devices, or an apparatus consisting of a single equipment.

The scope of the present invention includes a case wherein the functions of the embodiments are implemented by supplying, from a storage medium or via a communication medium such as the Internet or the like, a program code of software that implements the functions of the embodiments to a computer (or a CPU or MPU) in a system or apparatus, which is connected to various devices to make these devices implement the functions of the aforementioned embodiments, and making the computer of the system or apparatus control the devices in accordance with the stored program.

In this case, the program code itself of software implements the functions of the embodiments, and the program code itself, and means for supplying the program code to the computer (e.g., a storage medium which stores the program code) constitutes the present invention. As the storage medium for storing such program code, for example, a flexible disk, hard disk, optical disk, magnetooptical disk, CD-ROM, magnetic tape, nonvolatile memory card, ROM, and the like may be used.

The program code is included in the embodiments of the present invention not only when the functions of the above embodiments are implemented by executing the supplied program code by the computer, but also when the functions of the embodiments are implemented by collaboration of the program and an OS (operating system) or another application software running on the computer.

Furthermore, the present invention includes a case wherein the functions of the above embodiments are implemented by some or all of actual processing operations executed by a CPU or the like arranged in a function extension board or a function extension unit, which is inserted in or connected to the computer, after the supplied program code is written in a memory of the extension board or unit.

According to the present invention, since a second conversion element used to detect the total dose of radiation that enters a conversion unit is arranged on a single substrate independently of pixels having first conversion elements, which are arranged in the conversion unit that outputs image information, the need for reading out outputs from the first conversion elements at high speed for the purpose of input dose adjustment can be obviated, and no sensor for adjusting the dose is required, thus simplifying the structure of the radiation image sensing apparatus.

The present invention is not limited to the above embodiments and various changes and modifications can be made within the spirit and scope of the present invention. Therefore, to apprise the public of the scope of the present invention, the following claims are made.

The invention claimed is:

1. A radiation image sensing apparatus comprising:
   a conversion unit which comprises a plurality of pixels arranged in a matrix on a substrate, each pixel including a first conversion element and a switch element connected to the first conversion element, wherein said conversion unit outputs a signal for image information in accordance with a dose of incident radiation,
   a second conversion element which is arranged on the substrate to detect at least any one of a dose of the incident radiation to said conversion unit, a radiation incident event to said conversion unit, and a radiation stop event, said second conversion element being arranged between the pixels in said conversion unit on the substrate,
   wherein an area of the first conversion element in the pixel, which is adjacent to said second conversion element, is smaller than that of the first conversion element, which is not adjacent to said second conversion element.

2. The apparatus according to claim 1, further comprising a signal line connected to the pixel, and wherein said second conversion element is arranged between the signal line and the pixel.

3. The apparatus according to claim 2, further comprising a driving line connected to the pixel, and wherein said second conversion element is arranged so as to run across to the driving line.

4. The apparatus according to claim 1, wherein said second conversion element has a different shape from that of the first conversion element.

5. The apparatus according to claim 1, further comprising
   a first processing circuit unit, which is connected to the plurality of the pixels, configured to process the signal to obtain the image information; and
   a second processing circuit unit, which is separated from said first processing circuit unit and is connected to said second conversion element, configured to process the signal from said second conversion element.

6. The apparatus according to claim 5, wherein said second conversion element is formed at a plurality of positions on the substrate, and said second processing circuit unit selects said second conversion element at an optimal position from the plurality of second conversion elements to process the signal from said second conversion element.

7. The apparatus according to claim 5, wherein said second processing circuit unit comprises:
   an addition unit configured to add electrical charges output from said second conversion element;
   an integral unit configured to integrate the electric charges added by said addition unit;
   a comparison unit configured to compare an integral value obtained by said integral unit with a predetermined threshold value; and
   a radiation stop unit, when said comparison unit determines that the integral value is larger than the threshold value, configured to stop radiation with which said conversion unit is irradiated.

8. The apparatus according to claim 5, further comprising
   a first bias unit connected to the plurality of the pixels; and
   a second bias unit connected to said second conversion element.

9. The apparatus according to claim 1, further comprising a waveform converter for converting radiation into light, and wherein the first conversion element includes a photoelectric conversion element having an MIS structure or a PIN structure.

10. A radiation image sensing apparatus comprising:
    a conversion unit which comprises a plurality of pixels arranged in a matrix on a substrate, each pixel including a first conversion element and a switch element connected to the first conversion element, wherein said conversion unit outputs a signal for image information in accordance with a dose of incident radiation,
    a second conversion element which is arranged on the substrate to detect at least any one of a dose of the incident radiation to said conversion unit, a radiation incident event to said conversion unit, and a radiation stop event, a second conversion element being arranged between the pixels in said conversion unit on the substrate,
    wherein said second conversion element has a semiconductor layer formed from the same semiconductor layer from which a semiconductor layer of the switch element is formed.

11. The apparatus according to claim 10, wherein the switch element is a thin film transistor, and said second conversion element is a photoelectric conversion element having an MIS structure or a PIN structure.

12. The apparatus according to claim 10, further comprising a signal line connected to the pixel, and wherein said second conversion element is arranged between the signal line and the pixel.

13. The apparatus according to claim 12, further comprising a driving line connected to the pixel, and wherein said second conversion element is arranged so as to run across to the driving line.

14. The apparatus according to claim 10, wherein said second conversion element has a different shape from that of the first conversion element.

15. The apparatus according to claim 10, further comprising
    a first processing circuit unit, which is connected to the plurality of the pixels, configured to process the signal to obtain the image information; and
    a second processing circuit unit, which is separated from said first processing circuit unit and is connected to said second conversion element, configured to process the signal from said second conversion element.

16. The apparatus according to claim 15, wherein said second conversion element is formed at a plurality of positions on the substrate, and said processing circuit unit selects said second conversion element at an optimal position from the plurality of said second conversion elements to process the signal from said second conversion element.

17. The apparatus according to claim 15, wherein said second processing circuit unit comprises:

an addition unit configured to add electrical charges output from said second conversion element;

an integral unit configured to integrate the electric charges added by said addition unit;

a comparison unit configured to compare an integral value obtained by said integral unit with a predetermined threshold value; and a radiation stop unit, when said comparison unit determines that the integral value is larger than the threshold value, configured to stop radiation with which said conversion unit is irradiated.

18. The apparatus according to claim 15, further comprising a first bias unit connected to the plurality of the pixels; and a second bias unit connected to said second conversion element.

19. The apparatus according to claim 10, further comprising a waveform converter for converting radiation into light, and wherein the first conversion element includes a photoelectric conversion element having an MIS structure or a PIN structure.

* * * * *